United States Patent
Musuluri

(10) Patent No.: US 10,223,455 B2
(45) Date of Patent: Mar. 5, 2019

(54) SYSTEM AND METHOD FOR BLOCK SEGMENTING, IDENTIFYING AND INDEXING VISUAL ELEMENTS, AND SEARCHING DOCUMENTS

(76) Inventor: Aravind Musuluri, Birmingham, AL (US)

(*) Notice: Subject to any disclaimer, the term of this patent is extended or adjusted under 35 U.S.C. 154(b) by 0 days.

(21) Appl. No.: 12/897,500

(22) Filed: Oct. 4, 2010

(65) Prior Publication Data

US 2011/0082868 A1 Apr. 7, 2011

Related U.S. Application Data

(60) Provisional application No. 61/247,973, filed on Oct. 2, 2009.

(51) Int. Cl.
*G06F 17/30* (2006.01)
*G06F 17/27* (2006.01)

(52) U.S. Cl.
CPC ...... *G06F 17/30867* (2013.01); *G06F 17/277* (2013.01); *G06F 17/3053* (2013.01); *G06F 17/30864* (2013.01)

(58) Field of Classification Search
CPC ......... G06F 17/30867; G06F 17/30864; G06F 17/3053
USPC ....................................................... 707/749
See application file for complete search history.

(56) References Cited

U.S. PATENT DOCUMENTS

| | | |
|---|---|---|
| 2003/0050927 A1 | 5/2003 | Hussam |
| 2004/0054654 A1 | 3/2004 | Nomiyama et al. |
| 2005/0050459 A1 | 3/2005 | Qu et al. |
| 2005/0187991 A1 | 8/2005 | Wilms et al. |
| 2005/0210008 A1 | 9/2005 | Tran et al. |
| 2007/0150494 A1 | 6/2007 | Harrington et al. |
| 2008/0222734 A1 | 9/2008 | Redlich et al. |
| 2009/0178144 A1 | 7/2009 | Redlich et al. |

OTHER PUBLICATIONS

S. Debnath et al.; Automatic Identification of Informative Sections of Web Pages; IEEE Transactions on Knowledge and Data Engineering; vol. 17, No. 9; Sep. 1, 2005; pp. 1233-1246; XP055103395; ISSN: 1041-4347; DOI: 10.1109/TKDE.2005.138.
Sandip Debnath et al.; Automatic Extraction of Informative Blocks from Webpages; Proceedings of the 2005 ACM Symposium on Applied Computing; SAC '05; Jan. 1, 2005; p. 1722; XP055103396; New York, NY; DOI: 10.1145/1066677.1067065; ISBN: 978-1-58-113964-8.
Lin S-H et al.; Discovering Informative Content Blocks from Web Documents; Proceedings of the 8th ACM SIGKDD International Conference on Knowledge Discovery and Data Mining; KDD-2002; Edmonton, Alberta, Canada; Jul. 23-26, 2002; International Conference on Knowledge Discovery and Data Mining; New York, NY; ACM, US, vol. Conf. 8, Jul. 23, 2002; pp. 588-593; XP002308551; ISBN: 978-1-58113-567-1.

*Primary Examiner* — Cam Y T Truong

(57) ABSTRACT

A method for segmenting, identifying and indexing visual elements, and searching documents comprises for each document generating metadata, segmenting the document into blocks using the metadata, performing block operations on the identified blocks, identifying and indexing inline visual elements using data and metadata rules, identifying and indexing block visual elements using profiles, and searching for documents containing visual elements.

20 Claims, 30 Drawing Sheets

```
Source Content
    301

<DIV>
    <H2>1975 World Cup</H2>
</DIV>
<DIV id="details">
WI Won by 17 runs
<DIV class="players">
    CH Lloyd: 102
    <BR/>
    RB Kanhai: 55
    <BR/>
    KD Boyce: 50/4
</DIV>
60 Over match
</DIV>
```

```
Presentation Semantics
        401 details
{
    font-size: 16px;
}
.players
{
    padding-top: 10px;
    padding-bottom: 10px;
    font-size: 12px;
}
```

Metadata
500 start-tag = div ~501
end-tag = div ~502 font-size = 16px ~503 font-family = Serif ~504
display = block ~505
visibility = visible ~506 x-location = 10px ~507
y-location = 272px ~508
width = 120px ~509
Height = 100px ~510 block = yes ~511
level = 2 ~512

FIG. 5

Criterion Set
600 display = block ~601

FIG. 6

Criterion Set
700

Start-tag = br ~701
display != none ~702

FIG. 7

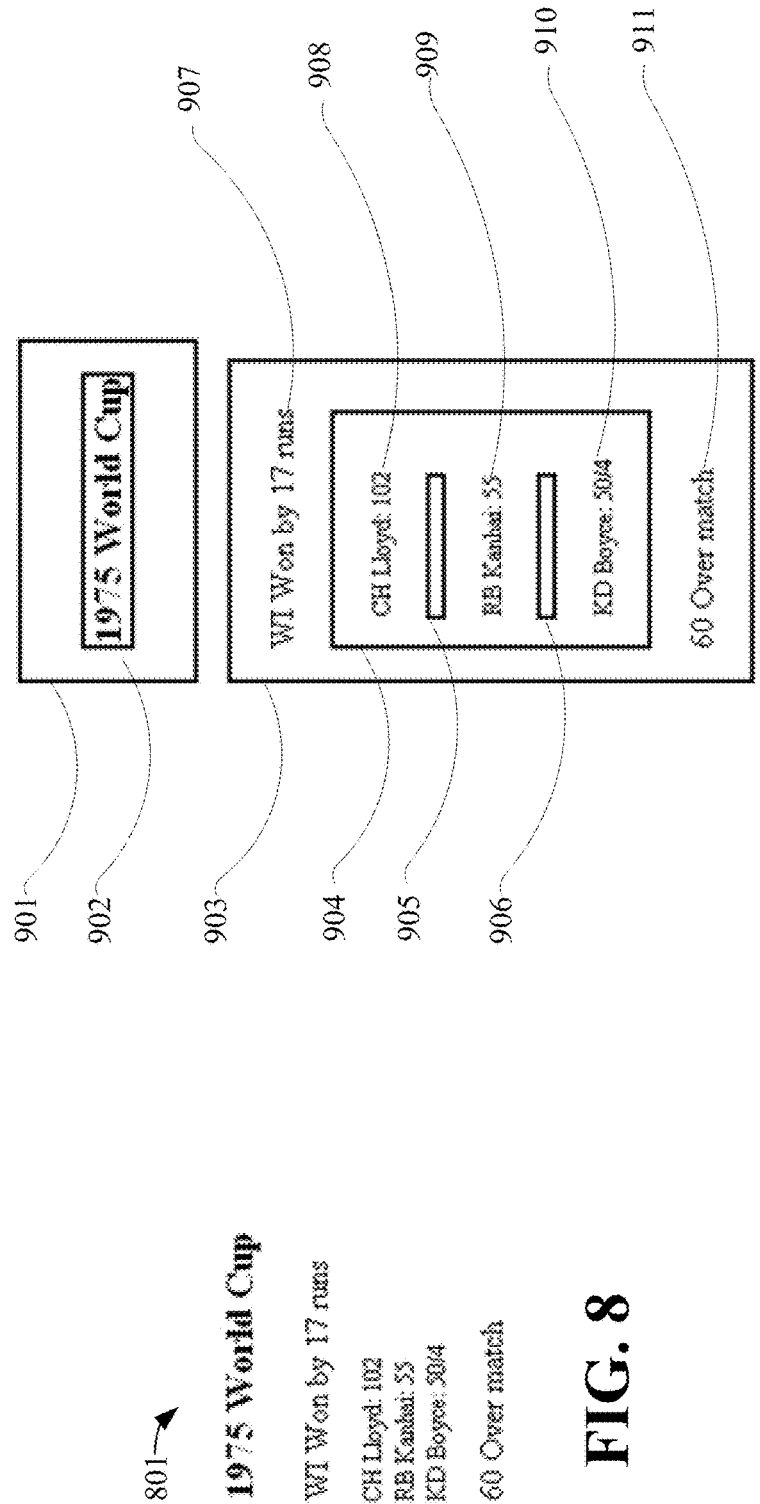

| Triplet | Importance |
|---|---|
| (Arial, 8, 400) | 0.8 |
| (Arial, 8, 700) — 1302 | 1.1 |
| (Arial, 10, 400) | 1.0 |
| (Verdana, 10, 400) | 1.15 |

Source Content
1501

```
<P>
    USA participated in the winter
olympics held in Canada. Among gold
medal winners from USA are: Bill
Demong, Shani Davis and Lindsey
Vonn.
</P>
```

Presentation Semantics
1701

```
.codeWords
{
    font-family: courier;
}
```

FIG. 17

Source Content
1601

```
<P>
    The <span class="codeWords">
text-decoration</span> property
allows certain text effects such as
underlining.
</P>
```

FIG. 16

Presentation Semantics
1900

```
tablestyle
{
    border:0px;
}
```

FIG. 19

Source Content
1800

```
<H2>A List of Countries</H2>
<TABLE class = "tablestyle">
    <TR>
        <TD> * </TD>        — 1803
        <TD> India </TD>    — 1804
    </TR>
    <TR>
        <TD> * </TD>        — 1805
        <TD> USA </TD>      — 1806
    </TR>
    <TR>
        <TD> * </TD>        — 1807
        <TD> China </TD>    — 1808
    </TR>
</TABLE>
```

Source Content
2100

```
<P>
<span class="bold">Diabetes</span>
is a condition in which the body
does not produce enough, or
properly respond to, insulin.
Insulin enables cells to absorb
glucose in order to turn it into
energy. The American Diabetes
Association reported in 2009 that
there are 12 million children and
adults in the United States-12.3%
of the population, who have
diabetes. In addition, the American
Diabetes Association estimated that
there are 6 (nearly one in two)
million diabetics unaware that they
have the disease.
</P>
```

Presentation Semantics
2200

```
.bold
{
    font-weight: bold;
}
```

FIG. 22

Source Content
2300

```
<P>
The doctor will perform the OGTT test on two
different days. Results and their meaning of
OGTT test are as shown in following table:
</P>
<TABLE>
  <TR>
    <TH>2-Hour Plasma Glucose Result(mg/dL)</TH>
    <TH>Diagnosis</TH>
  </TR>
  <TR>
    <TD>139 and below</TD>
    <TD>Normal</TD>
  </TR>
  <TR>
    <TD>140 to 199</TD>
    <TD>Pre-diabetes</TD>
  </TR>
  <TR>
    <TD>200 and above</TD>
    <TD>Diabetes</TD>
  </TR>
</TABLE>
```

2301 — <P> ... </P>
2302 — <TABLE> <TR>
2303 — <TH>2-Hour Plasma Glucose Result(mg/dL)</TH>
2304 — <TH>Diagnosis</TH>
2305 — <TD>139 and below</TD>
2306 — <TD>Normal</TD>
2307 — <TD>140 to 199</TD>
2308 — <TD>Pre-diabetes</TD>
2309 — <TD>200 and above</TD>
2310 — <TD>Diabetes</TD>

FIG. 23

Presentation Semantics
2400

```
table
{
  background-color: black;
}
table th, table td
{
  padding: 5px;
  background-color: white;
}
```

FIG. 24

Source Content
2500

```
<P>
The doctor will perform the OGTT test on two different days.
Results and their meaning of OGTT test are as shown in following
table:
</P>
<div class="t">
    <div class="tr">
        <div class="thc">2-Hour Plasma Glucose Result (mg/dL)
        </div>
        <div class="thc">Diagnosis</div>
    </div>
    <div class="tr">
        <div class="tc">139 and below</div>
        <div class="tc">Normal</div>
    </div>
    <div class="tr">
        <div class="tc">140 to 199</div>
        <div class="tc">Pre-diabetes</div>
    </div>
    <div class="tr">
        <div class="tc">200 and above</div>
        <div class="tc">Diabetes</div>
    </div>
</div>
```

Presentation Semantics
2600

```
.t {
    display: table;
    border: 1px solid black;
}
.tr {
    display: table-row;
    border: 1px solid black;
}
.thc {
    display: table-cell;
    padding: 5px;
    border: 1px solid black;
    font-weight: bold;
}
.tc {
    display: table-cell;
    padding: 5px;
    border: 1px solid black;
}
```

FIG. 26

Presentation Semantics
2800

```
th
{
    font-size: 22px;
}
```

FIG. 28

Source Content
2700

```
<TABLE border="1">
    <TR>
        <TH colspan="2">United States Economic
Indicators</TH>
    </TR>
    <TR>
        <TD>GDP:</TD>
        <TD>$13 Trillion</TD>
    </TR>
    <TR>
        <TD>Unemployment rate:</TD>
        <TD>9.4%</TD>
    </TR>
    <TR>
        <TD>Inflation:</TD>
        <TD>1%</TD>
    </TR>
</TABLE>
```

Source Content
2900

2901 — `<H5>Q: Are scientists close to finding a cure for diabetes?</H5>`

2902 — `<P>`
`Scientists are trying very hard to identify cure but at present there are no promising cures.`
`</P>`

FIG. 29

Source Content
3000

<UL>
<LI><A href="home">Home</A></LI>
<LI><A href="myAccount">My Account</A></LI>
<LI><A href="downloads">Downloads</A></LI>
<LI><A href="support">Support</A></LI>
</UL>

Presentation Semantics
3100

```
li
{
  display: inline;
}
```

FIG. 31

Presentation Semantics
3300

.fixedWidthText
{
font-family: monospace;
}
th
{
font-size: 22px;
}

FIG. 33

Source Content
3200

```
<TABLE border="1">
  <TR>
    <TH colspan="2">Method Summary
    </TH>
  </TR>
  <TR class="fixedWidthText">
    <TD>int</TD>
    <TD>getMinutes()</TD>
  </TR>
  <TR class="fixedWidthText">
    <TD>int</TD>
    <TD>getSeconds()</TD>
  </TR>
  <TR class="fixedWidthText">
    <TD>long</TD>
    <TD>getTime()</TD>
  </TR>
</TABLE>
```

Source Content
3400

3401 — `<H2>United States Timeline</H2>`
3402 — `<UL>`
3403 — `<LI>1776 - Declaration of Independence</LI>`
3404 — `<LI>1783 - End of revolutionary war</LI>`
3405 — `<LI>1868 - 8 hour day for federal employees</LI>`
3406 — `<LI>1929 - Stock market crashes</LI>`
3407 — `<LI>1959 - Hawaii admitted</LI>`
`</UL>`

FIG. 34

Source Content
3500

3501 — `<H2>Chart I: GDP growth – India and World</H2>`

3502 — 
```
<DIV>
    <IMG src="http://www.abd.com/chart1.jpg" width="455" height="185" alt="India and World GDP growth chart"/>
</DIV>
```

FIG. 35

Source Content
3600

```
<H2>Diabetes Interactive Tutorial</H2>

<object height="100%" align="" width="100%" id="PEI"
    codebase="http://download.macromedia.com/pub/shockwave/
cabs/flash/swflash.cab#version=8,0,0,0"
    classid="clsid:D27CDB6E-AE6D-11cf-96B8-444553540000">
    <param value="../../common/
patienteducation.swf?modulepath=instructions" name="movie"/>
    <param value="false" name="loop"/>
    <param value="high" name="quality"/>
    <param value="#dcd4d2" name="bgcolor"/>
    <embed height="100%" align="" width="100%"
pluginspage="http://www.macromedia.com/go/getflashplayer"
        type="application/x-shockwave-flash" name="PEI"
bgcolor="#dcd4d2" quality="high" loop="false"
        src="../../common/
patienteducation.swf?modulepath=instructions"/>
</object>
```

```
Source Content
3700

<DIV class="vse-timeline">
    <H2 class="vse-title">United States Timeline</H2>
    <UL>
        <LI class="vse-event">1776 - Declaration of Independence</LI>
        <LI class="vse-event">1783 - End of revolutionary war</LI>
        <LI class="vse-event">1868 - 8 hour day for federal employees</LI>
        <LI class="vse-event">1929 - Stock market crashes</LI>
        <LI class="vse-event">1959 - Hawaii admitted</LI>
    </UL>
</DIV>
```

FIG. 37

Diabetes Symptoms 4202

Search 4203

4204

Diabetes Specialists of America
Symptoms of Diabetes are
o Polyuria
o Polydipsia ...
www.dsa.com/intro.html

4205

Diabetes Society
If you have any of the following symptoms, you may be suffering from Diabetes
1. Weight Loss
2. Polydipsia ...
www.diabeticsociety.com/info.html

4206

American Medical Professionals
People who have Diabetes suffer from one or more of the following symptoms
a. Blurred Vision
b. Weight Loss ...
www.diabeticsociety.com/pages/symptoms.asp Previous 1 2 3 4 5 Next    4207

Advertisements Section
4208

SYSTEM AND METHOD FOR BLOCK SEGMENTING, IDENTIFYING AND INDEXING VISUAL ELEMENTS, AND SEARCHING DOCUMENTS

CROSS REFERENCE TO RELATED APPLICATION

This application claims priority to U.S. Provisional Application Ser. No. 61/247,973 entitled System and Method for Segmenting, Indexing and Searching Documents, filed on Oct. 2, 2009, which is incorporated herein by reference.

FIELD OF THE DISCLOSURE

The present disclosure generally relates to methods and systems for searching data sources. More particularly, it relates to methods for customizing computer searches to the needs of the searcher. It further relates to methods for displaying of search results, in such a way that it facilitates easy understanding of the nature and scope of information found by his search.

BACKGROUND

The statements in this section merely provide background information related to the present disclosure and may not constitute prior art.

In the current Information Age, users have access to large quantities of data on their local computers and almost limitless quantities of data on the intranets and the worldwide computer network known as the Internet.

In order to find desired information, a user typically uses search engines which are ubiquitous, come in a variety of forms and well known in the art. Some search engines are embedded within a program. They are typically used to find information within a single document that is currently open within the program. Common exemplary document search engines include Microsoft® Notepad Find feature and Microsoft® Outlook® Search feature. On the other hand, a desktop search engine enables users to find information on the local computer. Common exemplary desktop search engines include Microsoft® Windows® XP Search and Mac® OS Finder. A web search engine enables users to find information over the Internet (or an intranet). Common exemplary web search engines include Google®, Bing® and Yahoo®. Some search engines are hybrid, in that, they search both local and remote data source(s).

In order to use a search engine, a user seeking information on a desired topic generally inputs a search query consisting of keyword(s) or phrase(s) relevant to the topic into the search interface of the search engine. If the search is performed across a single document, the search engine typically highlights the matches within the document itself. If the search is performed across multiple documents, the search engine typically displays a report with a prioritized list of links pointing to relevant documents containing the search keywords. Oftentimes, a short summary of text is also included for each result. The summary is that portion or portions of the text in the document that contain the keywords from the search query.

Despite the many capabilities of existing search engines, deficiencies still exist in the art. A typical Internet search by a web search engine finds massive amounts of irrelevant data. It takes considerable amount of time and effort on the part of the user to sift through the results before finding the relatively few web pages that are relevant to his needs.

The reason why search engines return so many irrelevant results is because indexing and searching by keywords themselves is not adequate. For example, it is not possible in existing search engines for a user interested in "India" to specify and restrict the search results to "key/value" pairs such as "Capital/New Delhi".

Another drawback of existing search engines is that they are useless to a user who doesn't already know the keywords relevant to the topic he is interested in. For example, if a user wants to find movies similar to "Jurassic Park", searching by the keywords "Jurassic Park" and "similar" is useless as it returns pages about "Jurassic Park" also containing the word "similar".

Yet another drawback of existing search engines is that they fail to present results in a way that is easy for the user to understand the nature and type of found results.

Systems for searching the Intranets, Extranets, Local Area Networks, individual computers and even single documents also generally suffer from these same drawbacks.

In view of the above drawbacks, there remains a need for an effective method of searching data sources for useful information relating to topics of interest.

SUMMARY

The following presents a simplified summary of the disclosure in order to provide a basic understanding of some aspects of the disclosure. This summary is not an extensive overview of the disclosure. It is not intended to identify key elements of the disclosure or to delineate the scope of the disclosure. Its sole purpose is to present some concepts of the disclosure in a simplified form as a prelude to the more detailed description that is presented later.

The disclosure described here is equally applicable to searching data sources for information on Intranets, Extranets, on large and small networks, on individual computer systems and individual programs/documents/files. Thus, while our disclosure and the examples of use given herein are sometimes described in terms of Internet searching, this is to be understood to be an example of the use and utility of the disclosure, and is not intended to imply any limitation in the scope of their use. To the contrary, the disclosure here disclosed should be understood to be applicable as well to such systems as Intranets, WANs, LANs, individual computer systems and individual programs/documents/files.

The disclosure described here is equally applicable to searching using any protocols and technologies developed or future developed for the purpose of communicating or transmitting data such as, but not limited to, HTTP, HTTPS, FTP, File, TCP/IP and POP3. Thus, while our disclosure and the examples of use given herein are sometimes described in terms of HTTP and TCP/IP, this is to be understood to be an example of the use and utility of the disclosure, and is not intended to imply any limitation in the scope of their use. To the contrary, the disclosure here disclosed should be understood to be applicable as well to any type of local or network protocol and technology known in the art or future developed for the purpose of sending and/or receiving data.

The disclosure described here is equally applicable to searching and returning links to any document containing text and optional presentation semantics (the look and feel instructions) such as, but not limited to, HTML, DHTML, XML, SGML, PDF, E-mail, Microsoft® Word documents, Microsoft® Powerpoint documents, news group postings, multimedia objects, Graphics Interchange Format images and/or Shockwave Flash files. The presentation semantics may be implicit or explicitly specified in a language know in the art or future developed such as, but not limited to, CSS. The presentation semantics for a document if explicitly specified may be included with in the same file along with the data or may be specified in external file(s) or a combination of both. An external presentation semantics file for a document may be herein referred to as presentation file. Thus, while our disclosure and the examples of use given herein are sometimes described in terms of HTML and CSS, this is to be understood to be an example of the use and utility of the disclosures, and is not intended to imply any limitation in the scope of their use. To the contrary, the disclosure here disclosed should be understood to be applicable as well to any document, file or combination of files assembled into a unit known in the art or future developed containing text, audio and video objects, images and other multimedia objects with optional presentation semantics instructions.

The present disclosure generally relates to methods and systems for searching data sources for information. More particularly, it relates to methods for vision-based identifying, extracting and indexing segments or parts of a document matching paragraph, table, list, menu, fixed width text, key/value, graph/chart, question/answer, timeline, and interactive (hereinafter referred to as "visual elements") types similar to the way human beings do by looking at the document on the display interface.

In one aspect of the disclosure, a human being identifies and/or extracts visual elements in a document of visual element types from the rendering of the document on a display interface such as a monitor or on paper. In still another aspect of the disclosure the system automatically identifies and/or extracts visual elements in a document of visual element types with the aid of blocks and profiles. In yet another aspect of the invention, a combination of human being and system may be used in the identification and extraction of visual elements.

A block is a logical unit of a document. A profile is a set of rules designed in such a way that it identifies and classifies a matching block(s) into a visual element type exactly like a human being would classify the block(s) by visually looking at the block(s) when it is displayed as part of the document on the display interface.

A further object of the present disclosure is to index and rank found visual elements.

A further object of the present disclosure is to provide interfaces to the user to search for information relating to a topic by restricting the results to one or more visual element types. In this, the search interface provides suggestions to the user during the search query inputting phase and further more suggestions on the results report.

A further object of the present disclosure is to display prioritized search results in response to user search query, as horizontal list and/or vertical list and/or in a grid.

A further object of the present disclosure is to display a brief summary as paragraph text for each search result. The summary is that portion or portions of the text in the document that contain the keywords from the search query. In another aspect of the present disclosure, the summary results are shown in the same visual type as found in the original document i.e. summary of a table visual type result in a table as found in the original document etc., In still yet another aspect, the result summary is shown in the same visual type and presentation semantics as found in the original document.

A further object of the present disclosure is to show advertisements on the results report when a search is performed by the user using a search query which further includes visual element types. In yet another aspect of the present disclosure, marketers can bid for advertisement space on the results report by search query which further includes visual element type(s). In still yet another aspect of the present disclosure, document author or document owners may pay a fee for the document visual elements to be indexed and included as part of search results.

DESCRIPTION OF THE DRAWING FIGURES

FIG. 3 depicts exemplary document source content data.

FIG. 4 depicts exemplary presentation semantics for the source content data of FIG. 3.

FIG. 5 depicts exemplary metadata for the source content data of FIG. 3.

FIG. 6 depicts exemplary criterion data for identification of blocks.

FIG. 7 depicts exemplary criterion data for identification of blocks.

FIG. 8 depicts an exemplary rendering to a display device the source content data of FIG. 3.

FIG. 9 depicts the rendering of FIG. 8 showing block demarcation performed by the block segmenting and indexing logic of FIG. 2.

FIG. 13 is a portion of a table showing importance value for each font family, font size, and font weight combination.

FIG. 15 depicts exemplary source content data containing a visual element of type "List".

FIG. 16 depicts exemplary source content data containing a visual element of type "Fixed Width Text".

FIG. 17 depicts exemplary presentation semantics data for the source content data of FIG. 16.

FIG. 18 depicts exemplary source content data containing a visual element of type "List".

FIG. 19 depicts exemplary presentation semantics data for the source content data of FIG. 18.

FIG. 21 depicts exemplary source content data containing a visual element of type "Paragraph".

FIG. 22 depicts exemplary presentation semantics data for the source content data of FIG. 21.

FIG. 23 depicts exemplary source content data containing a visual element of type "Table".

FIG. 24 depicts exemplary presentation semantics data for the source content data of FIG. 23.

FIG. 25 depicts exemplary source content data containing a visual element type "Table".

FIG. 26 depicts exemplary presentation semantics data for the source content data of FIG. 25.

FIG. 27 depicts exemplary source content data containing a visual element of type "Key/Value".

FIG. 28 depicts exemplary presentation semantics data for the source content data of FIG. 27.

FIG. 29 depicts exemplary source content data containing a visual element of type "Question/Answer".

FIG. 30 depicts exemplary source content data containing a visual element of type "Menu".

FIG. 31 depicts exemplary presentation semantics data for the source content data of FIG. 30.

FIG. 32 depicts exemplary source content data containing a visual element of type "Fixed Width Text".

FIG. 33 depicts exemplary presentation semantics data for the source content data of FIG. 32.

FIG. 34 depicts exemplary source content data containing a visual element of type "Timeline".

FIG. 35 depicts exemplary source content data containing a visual element of type "Graph/Chart".

FIG. 36 depicts exemplary source content data containing a visual element of type "Interactive".

FIG. 37 depicts exemplary source content data in accordance with an embodiment of the present disclosure.

FIG. 42 depicts exemplary results report that may be presented to the user by the search engine system of FIG. 1 in response to a user search for visual elements of type "List".

FIG. 43 depicts another exemplary results report that may be presented to the user by the search engine system of FIG. 1 in response to a user search for visual elements of type "List".

FIG. 44 depicts exemplary results report that may be presented to the user by the search engine system of FIG. 1 in response to a user search for visual elements of types "List" and "Table".

DETAILED DESCRIPTION

The present disclosure relates to systems and methods for searching and indexing document(s). A system in accordance with an embodiment of the present disclosure employs a crawler that locates documents (or web pages) on the network. Once the documents are located, the system breaks each of the located documents into blocks based upon predefined rules. In addition, the system locates visual elements within each of the documents based upon predefined rules. For example, the system locates tables, paragraphs, titles, lists, and fixed width text within the documents based upon predefined rules. Such determinations of visual elements are made by analyzing the document source content, the presentation semantics for the document, and metadata related to the document. Once the visual elements are discovered they are indexed. A user can then search for documents containing visual elements.

Figure 1:
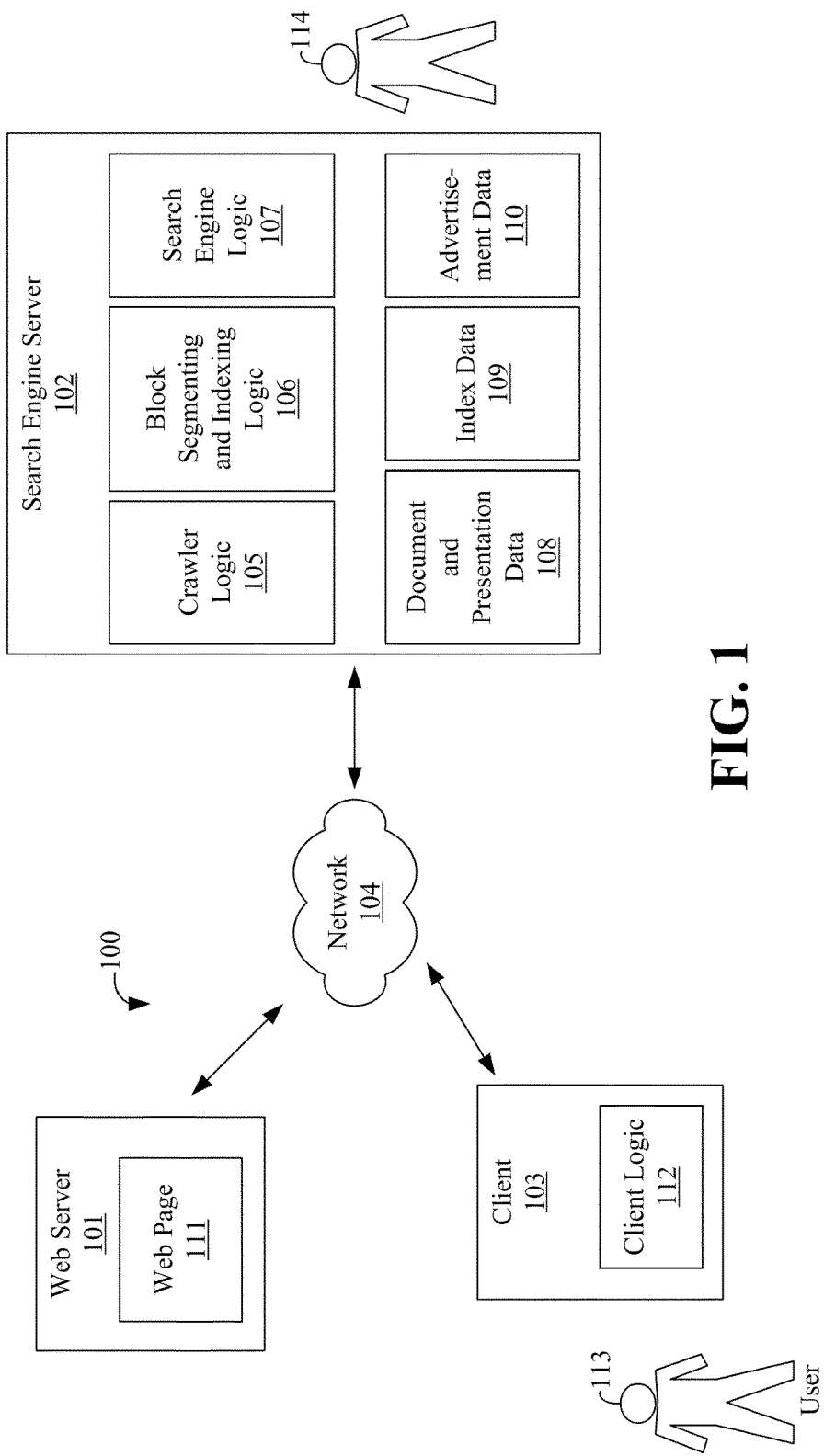
FIG. 1 is a block diagram illustrating an exemplary search engine system in accordance with an embodiment of the present disclosure.

FIG. 1 depicts a web search engine system 100 in accordance with an exemplary embodiment of the present disclosure. The system 100 comprises a web server 101, a search engine server 102, and a client 103. The web server 101, the search engine server 102, and the client 103 all communicate over a network 104.

The network 104 can include any type of network known in the art or future-developed. In this regard, the network 104 may be an Ethernet, a local area network (LAN), or a wide area network (WAN), e.g., the Internet, or a combination of networks.

The exemplary search engine server 102 comprises crawler logic 105, block segmenting and indexing logic 106, search engine logic 107 along with document and presentation data 108, index data 109 and advertisement data 110.

In the exemplary search engine server 102, the crawler logic 105 obtains web documents, typically HTML web pages and their associated cascading style sheet (CSS) presentation files, and stores them in the document and presentation data 108. The crawler logic 105 is an automated browser which follows every link to a document it encounters in a crawled document. Each link identifies a web page 111 served the web server 101. For simplicity, only one web page 111 served by one web server 101 is shown in FIG. 1. However, the web server 101 can serve multiple documents and the crawler logic 105 can obtain any document identified by a link and served by a web server as long as the web server is communicatively coupled to the network 104. Note that web page 111 may be a web page or a document.

Note that the crawler logic 105 may store additional information relating to the document such as, the link identifying the document, the date and time when the document was last modified, the date and time when the document was crawled, the size of the document and so on in the document and presentation data 109.

Further note that in those instances where the documents to be searched and their corresponding presentation files are already conveniently available to the block segmenting and indexing logic 106, the crawler logic 105 may not be required.

The search engine server 102 further comprises the block segmenting and indexing logic 106. The block segmenting and indexing logic 106 analyzes documents along with their corresponding presentation files in the document and presentation data 108. For each document, the block segmenting and indexing logic 106 divides the document into logical units, herein referred to as blocks, and identifies visual elements that are part of the each block with the aid of profiles. It further creates an index of the identified visual elements in the index data 109. The block segmenting and indexing logic 106 is further explained with reference to FIG. 3 through FIG. 38.

Once the index has been created and stored in the index data 109, a user 113 through the client logic 112 running on the client computing device 103 may enter a search query consisting of keyword(s) and one or more visual element types which may identify the type of the information that the user is interested in retrieving. Exemplary interfaces shown by the client logic 112 to the user 113 to receive user search query are described further with reference to FIG. 39 through FIG. 44.

The client logic 112 may comprise, for example, an Internet browser; however, other types of client logic 112 for interfacing with the user 113 and for communicating with the search engine logic 107 may be used in other embodiments of the present disclosure. The client logic 112 transmits the user search query to the search engine server 102 via the network 104. Upon receiving the user search query the search engine logic 107 examines the index data store 109 to determine whether it contains the terms that match the user search query narrowed down by the visual element type(s) in the user's search query. If so, the search engine logic 107 compiles a prioritized list of all the documents containing all or some of the keywords in the specified visual element type(s) and returns the list to the client logic 106, which displays the results to the user 113 in a window.

In another embodiment, upon receiving the user search query, the search engine logic 107 instead of narrowing down the search results by the visual element type(s) in the user search query, may assign more relevance or a higher rank to documents with keywords found within the visual element type(s) as specified in user search query. Thus, if two web pages (or documents) have a word matching the keyword in the user search query and one of the web pages has the keyword within a visual element of type specified in the user search query, all else being equal, the web page with the keyword within the visual element of type specified by the user will be ranked higher in the search results sent to the user in response to the search query. Accordingly, the search results are not only based on whether and to what extent a given web page has words matching a keyword, but the search results are also based on the context in which the matching words are used (e.g., whether the matching words are used in a visual element of a specified type).

In another embodiment, the search engine logic 107 may also include advertisements from the advertisement data 110 along with the search results in the response to the user search query.

Figure 2:
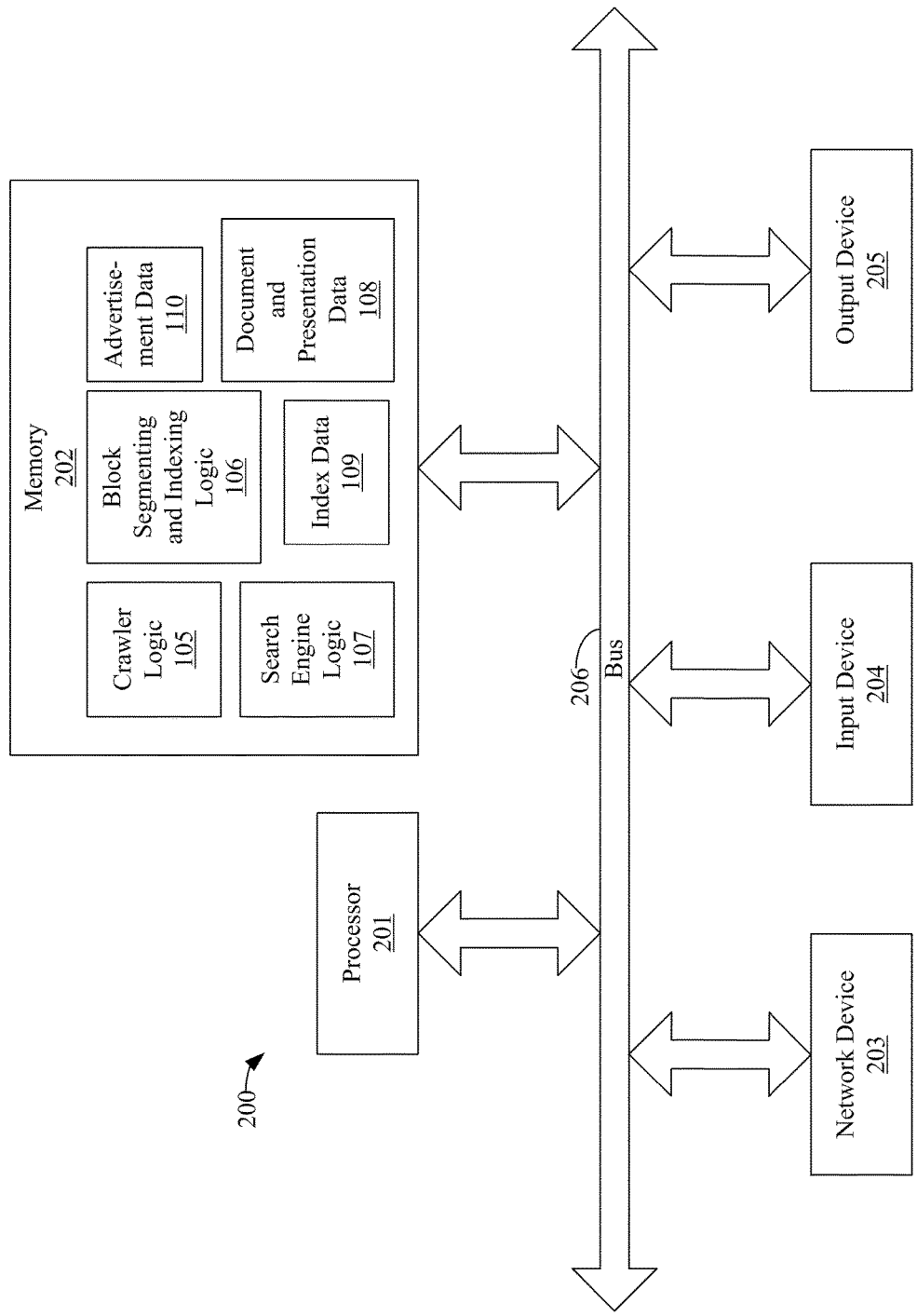
FIG. 2 is a block diagram illustrating an exemplary search engine computing device of FIG. 1.

FIG. 2 depicts an exemplary search engine server 102 in accordance with an embodiment of the present disclosure. The search engine server 102 is only one example of a suitable computing environment and it is not intended to suggest any limitation as to the scope of use or functionality of the disclosure.

Search engine server 102 may include a bus 206, a processing unit 201, memory 202, network device 203, input device 204, and an output device 205. Bus 206 may include a path that permits communication among the components of the computing device 200.

The memory 202 stores the crawler logic 105, the block segmenting and indexing logic 106, the search engine logic 107, the document and presentation data 108, the index data 109, and the advertisement data 110. Such components may be implemented in software, hardware, firmware, or a combination of hardware, software or firmware. In the exemplary embodiment, the crawler logic 105, the block segmenting and indexing logic 106, the search engine logic 107, the document and presentation data 108, the index data 109, and the advertisement data 110 are shown as software stored in memory 202.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage device, including hard disks, floppy discs, or magnetic tapes, and optical discs.

The processing unit 201 comprises processing hardware for interpreting or executing tasks or instructions stored in memory 202. Note that the processing unit 201 may be a microprocessor, digital processor, or other type of circuitry configured to run and/or execute instructions.

The network device 203 may be any type of network device (e.g., a modem) known in the art or future-developed for communicating over a network 104 (FIG. 1). In this regard, the search engine server 102 (FIG. 1) communicates with the web server 101 (FIG. 1) and the client computing device 103 (FIG. 1) over the network 104 (FIG. 1) via the network device 203.

The input device 204 is any type of input device known in the art or future-developed for receiving data from the user 114 (FIG. 1). As an example, the input device 204 may be a keyboard, a mouse, a touch screen, a serial port, a scanner, a camera, or a microphone.

The output device 205 may be any type of output device known in the art or future-developed for displaying data to the user 114 (FIG. 1). As an example, the output device 205 may be a liquid crystal display (LCD) or other type of video display device, a speaker, or a printer.

Note that the disclosure may also be practiced in a distributed computing environment where tasks or instructions of search engine server 102 (FIG. 1) are performed by multiple computing devices communicatively coupled to the network.

Further note that, the search engine server 102 components may be implemented by software, hardware, firmware or any combination thereof. In the exemplary search engine server 102, depicted by FIG. 1, all the components are implemented by software and stored in memory 202.

FIG. 3 through FIG. 14 illustrate the division of a document into blocks by the block segmenting and indexing logic 106, which further enhances the ability of the system to locate visual elements within the document.

As noted earlier a block is a logical unit of a document. One way of thinking about blocks may be as follows: characters make words, words make sentences, sentences make blocks, blocks make bigger blocks and the document itself is the biggest block. Depending on the document type, line breaks, markup, presentation semantics and/or computed data help in identifying a block.

As noted above, blocks can be nested in that a block can contain inner block(s). The block containing an inner block may be referred to as the parent block of the inner block which in turn may be referred to as the child block. The parent block always encloses the entirety of the child block. Note that because of nesting, a block may have multiple parent blocks. A block with no child block(s) is a special type of block and may be referred to as block item. The entire document is a logical unit and hence is also a block and is referred to as the root block. Every block, other than the root block, has a parent block.

To keep track of the nesting of blocks, each block is assigned a level. Block levels are assigned such that two blocks with the same number of parent blocks must have identical levels and two blocks with different number of parent blocks must have different levels. In the exemplary embodiment of the present disclosure, the level of a block is equal to the number of its parents block. The level of the root block is zero.

Once the crawler logic 105 (FIG. 1) downloads the document along with any presentation files relating to the document to the document and presentation data 108 (FIG. 1), the block segmenting and indexing logic 106 (FIG. 1) analyzes the document source content along with its presentation semantics and generates initial metadata. Metadata, as the term is used herein, is to be broadly interpreted to include any information gathered, assumed or computed relating to the document. In this regard, the metadata may include such things as markup, markup attributes, implicit and explicit presentation semantics, positional data of the text if the document were rendered on a display device, comments, additional computed values about the text itself such as, is the text a block, is the text a block item, average font size and so on, and additional computed values from the previously identified/computed metadata. Such examples of metadata are exemplary and other types of metadata may be used in other embodiments.

Note that initial metadata may be augmented by more metadata throughout the execution of block segmenting and indexing logic 106 (FIG. 1). Also, note that different segments of the document may have different metadata. Further note that the amount and type of metadata generated varies from one document type to other.

FIG. 3 depicts source content 301 of a portion of an exemplary HTML document 300 downloaded and stored in the document and presentation data 108 (FIG. 1) by the crawler logic 105 (FIG. 1). The source content 301 consists of the <DIV> element 302 and the <DIV> element 303. The two empty <BR> elements 304 and 305 are nested within the <DIV> element 303. Note that the source content 301 is made up of markup content and text content.

FIG. 4 depicts a presentation semantics portion 401 of exemplary presentation semantics 400 downloaded and stored in the document and presentation data 108 (FIG. 1) by the crawler logic 105 (FIG. 1) for the HTML document 300 (FIG. 3). The presentation semantics 401 relate to the source content 301 (FIG. 3).

FIG. 5 depicts a portion of metadata 500 generated by the block segmenting and indexing logic 106 (FIG. 1) for the <DIV> element 303 (FIG. 3). The metadata 500 comprises a plurality of metadata properties 501-512. Each metadata property is made up of a key/value pair. The metadata properties 501 and 502 are inferred from the markup for the <DIV> element 303 (FIG. 3). The metadata property 503 is inferred from the explicit presentation semantics 401 (FIG. 4). The metadata properties 504, 505 and 506 are inferred from the implicit presentation semantics for the document 300 (FIG. 3). The metadata properties 507 through 510 are inferred from the rendering of the document 300 (FIG. 3). The metadata properties 507 and 508 identify the starting location on the display interface where the text content inside the <DIV> element 303 (FIG. 3) begin as seen by the user. The metadata properties 509 and 510 identify the width and height respectively on the display interface as seen by the user of the text content inside the <DIV> element 303 (FIG. 3). Note that the rendering of the document to compute metadata may be done in memory 202 (FIG. 2) on a virtual display interface.

The metadata properties 511 and 512 are inferred from computation by the block segmenting and indexing logic 106 (FIG. 1) and augmented to existing metadata for the <DIV> element 303 after the block identification process described further with reference to FIG. 6 through FIG. 12. Assume that the <DIV> element 303 (FIG. 3) is identified as a block by the block segmenting and indexing logic 106 (FIG. 1) during the block identification process. This information is preserved in the metadata property 511. The metadata property 512 preserves the computed level of the block.

The next step performed by the block segmenting and indexing logic 106 (FIG. 1) after the initial computation of metadata from document source content and presentation semantics is the identification of blocks. To determine if a segment of the document is a block or not, the block segmenting and indexing logic 106 (FIG. 1) checks to see if the segment of the document meets all the criteria in at least one block identifying criterion set. Each criterion in the criterion set is a rule on a metadata property which evaluates to either true or false. The block identifying criterion sets are designed in such a way that only block segments evaluate to true for all the criteria in the criterion set.

One way of coming up with criteria for a block identifying criterion set may be visually looking at a document and identifying blocks in the document, generating metadata for the document content, and identifying and generalizing those particular metadata properties which characterize the visually identified segments as blocks.

Note that there may be multiple block identifying criterion sets and if the document segment satisfies at least one block identifying criterion set, the document segment is a block.

FIG. 6 depicts an example of block identifying criterion set 600. The criterion set 600 consists of just one criterion 601. Any segment with metadata property key equals "display" and corresponding metadata property value equals "block" evaluates to true for the criterion 601. Note that the <DIV> element 303 (FIG. 3) has a metadata property 505 (FIG. 5) which satisfies the criterion 601 and hence the criterion set 600. Since the <DIV> element 303 (FIG. 3) satisfies at least one criterion set, it is a block.

FIG. 7 depicts another example of a block identifying criterion set 700. The criterion set 700 consists of two criteria 701 and 702. The criterion 701 requires that there be a metadata property with the key "start-tag" and corresponding metadata property value "br." The criterion 702 requires there not be a metadata property with the key display and corresponding metadata value none. The metadata (not shown) for the <BR> elements 304 (FIG. 3) and 305 (FIG. 3) satisfy both the criterion in the criterion set 700. Hence, the empty <BR/> elements are also blocks.

FIG. 8 is a diagram of that portion 801 of the document 300 (FIG. 3) identified by the source content 301 (FIG. 3) and as seen by the user on a display interface. Note that while the source content 301 (FIG. 3) is made up of markup content and text content, when the document is rendered on the display interface the user only sees the text content.

FIG. 9 is a diagram illustrating all the blocks in the portion of the document 300 (FIG. 3) identified by the source content 301 (FIG. 3). Solid boxes are used in FIG. 9 to designate blocks 901 through 906 that are identified by the block segmenting and indexing logic 106 (FIG. 1) through block identifying criterion sets. Note that block item 902 is a child block of block 901. Further note that block 904 is an immediate child of block 903 whereas block 905 is a child block of block 903 but not an immediate child block of block 903.

In the exemplary embodiment of the present disclosure, all the text segments in the document may belong to a block item. It doesn't necessarily have to be the same block item. Further, no text segment should belong to more than one block item. The text inside the block item 902 satisfies these conditions as it is part of one and only one block item 902. However, notice that there are islands of text segments 907 through 911 that are part of blocks but not part of any block item. These islands of text segments are designated as block items by the block segmenting and indexing logic 106 (FIG. 1). Text segment 907 is designated as a block item with the parent block as block 903. Similarly, the rest of the text segments 908 through 911 will be designated as block items. Note that a block item is also a block.

Note that in other embodiments, only some or none of the island text segments may be designated as block items.

At this stage the block segmenting and indexing logic 106 (FIG. 1) has segmented the entire document into blocks and a list of identified blocks is prepared. Next, the block segmenting and index logic 106 (FIG. 1) performs a series of operations on the blocks in the block list.

The first block operation performed by the block segmenting and indexing logic 106 (FIG. 1), is to identify and remove any empty blocks from the block list. To achieve this objective the block segmenting and indexing logic 106 (FIG. 1) iterates over all the identified blocks in the block list in the descending order of their level and for each block checks to see if the block is empty. If the block is determined to be empty, the block is removed from the block list. A block is considered empty if nothing relating to the block is rendered or drawn on the display interface. Empty blocks may be identified by empty block identifying criterion sets. To be identified as an empty block a block must satisfy all the criteria in at least one empty block identifying criterion set. Metadata properties such as display equals none, visibility equals hidden, display area equals 0 and overflow equals hidden, or no visible text and no visible border in the block help in identifying empty blocks and are candidates for criterion in empty block identifying criterion set.

Again, the art of identifying empty blocks can be perfected by processing a document and comparing the results to visually looking at the rendered document. If no part of a block is rendered on the screen and the program fails to flag the block as empty block, then there exists a combination of generalized metadata properties which identify empty blocks which need to be incorporated into block segmenting and indexing logic 106 (FIG. 1). On the other hand if the block segmenting and indexing logic 106 (FIG. 1) flags a block as empty block and some part of the block can be seen when the document is rendered on the display interface, then there exists a set of generalized metadata properties which are flagging a block as empty when it is not and should not be used for the purpose of identifying empty blocks.

As noted earlier, the block segmenting and indexing logic identified blocks 901 through 911 (FIG. 9) within the source content 301 (FIG. 3). As can be inferred from the rendering of the source content 301 (FIG. 3) in FIG. 8, no part of the blocks 905 and 906 are displayed on the display interface and hence blocks 905 and 906 are empty blocks. The block segmenting and indexing logic 106 (FIG. 1) identifies the blocks 905 and 906 as empty blocks as both blocks have no visible text and no visible border and removes them from the block list. Also, note that removing blocks 905 and 906 results in block 904 with three child block items 908, 909 and 910 instead of five child block items.

The next operation performed by the block segmenting and indexing logic 106 (FIG. 1) is to check if any block items overlap. It is already known from the positional metadata the rectangular area occupied by each block item. If two or more block items overlap with each other, all the overlapping block items may be deleted from the block list.

Note that in other embodiments, only the blocks which are being overlapped by other block(s) may be deleted from the block list. In yet another embodiment, only the blocks which are being overlapped by other non-transparent block(s) may be deleted from the block list.

The next block operation performed by the block segmenting and indexing logic 106 (FIG. 1) is the identification and removal of intermediate blocks from the block list. A block is considered an intermediate block if it has only one immediate child block.

Figure 10:
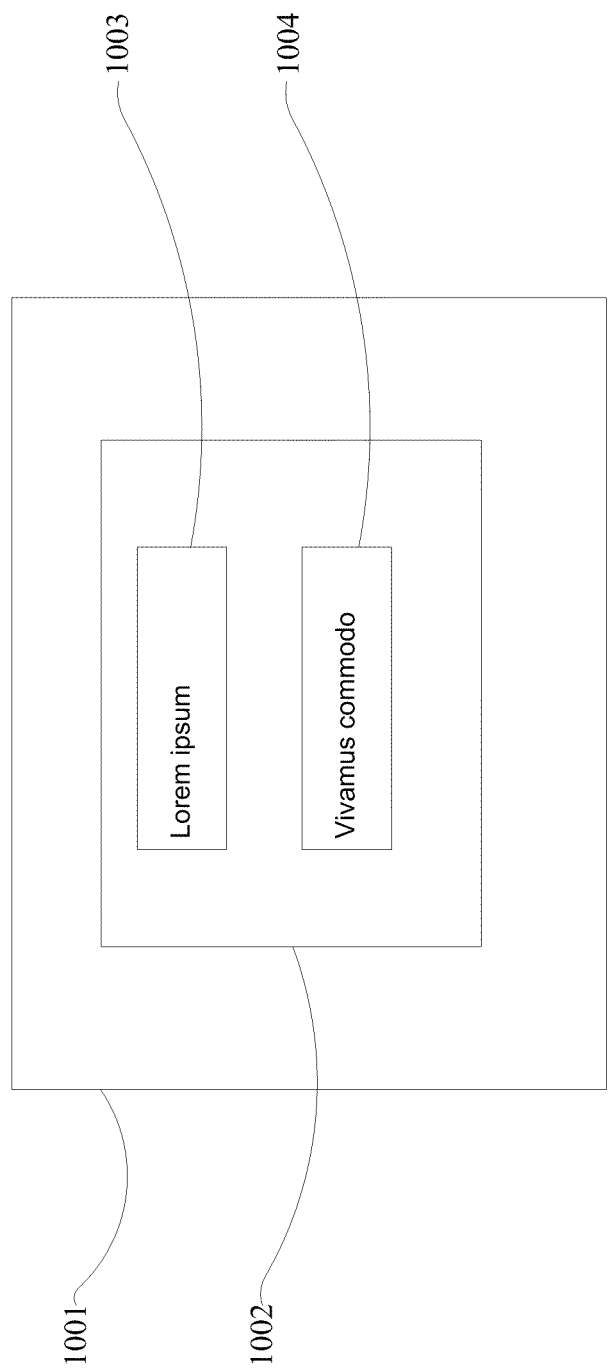
FIG. 10 depicts an exemplary block demarcation performed by the block segmenting and indexing logic of FIG. 2.

FIG. 10 is a diagram illustrating a portion of a document (not to scale) as seen by the user and superimposed on the diagram are boxes to designate blocks identified by the block segmenting and indexing logic 106 (FIG. 1) in that portion. The segment consists of four blocks 1001 through 1004. Assume that the level of block 1001 is 2, level of block 1002 is 3, and for blocks 1003 and 1004 the level is 4. The block segmenting and indexing logic 106 (FIG. 1) computes that block 1001 has only one immediate child block 1002, and hence block 1001 is an intermediate block and is removed from the block list. The child blocks 1002, 1003 and 1004 of the intermediate block 1001 now become child blocks of block 1001 immediate parent block (not shown). Further, the levels of all the blocks in the intermediate block 1001 are recomputed which results in a new level of 2 for block 1002 and level 3 for blocks 1003 and 1004.

Note that some other blocks such as table row blocks, header blocks, footer blocks, and caption blocks may also be considered as intermediate blocks.

The next operation performed by the block segmenting and indexing logic 106 (FIG. 1) is the merging of qualified blocks into larger blocks. While looking at a rendered document segment, if a user sees and recognizes a single logical unit, while the block segmenting and indexing logic 106 (FIG. 1) identifies more than one block for the same document segment, the two or more identified blocks become candidates for merging into a single block.

Figures 11, 12:
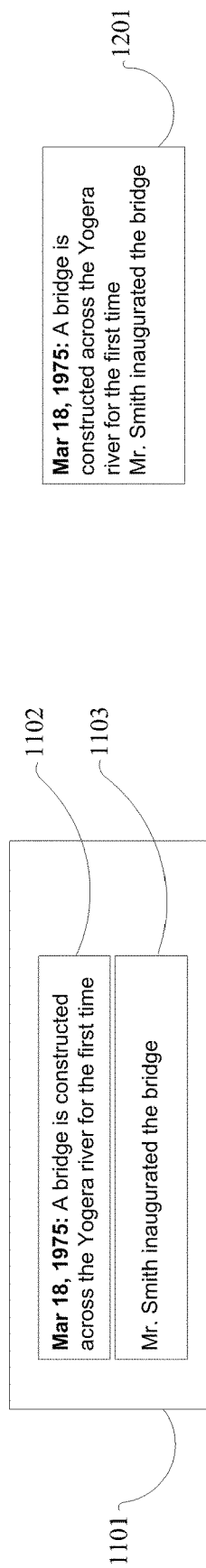
FIG. 11 depicts an exemplary block demarcation performed by the block segmenting and indexing logic of FIG. 2.
FIG. 12 depicts a merger of the blocks of FIG. 11.

Assume that FIG. 11 depicts (not to scale) a portion of the rendered document and further assume that the block segmenting and indexing logic 106 (FIG. 1) identified three blocks 1101, 1102 and 1103 depicted by the superimposed boxes in FIG. 11. While the block segmenting and indexing logic 106 (FIG. 3) identified three blocks, a user looking at document may only identify one logical unit. Since block 1102 starts with a date and may be part of a timeline visual element and block 1103 doesn't start with a date, the blocks may be merged. When the blocks 1102 and 1103 are merged into a single block 1201 (FIG. 12), the block 1101 qualifies as an intermediate block and hence is removed which results in the recalculation of parent block and level for block 1201 (FIG. 12). FIG. 12 depicts the same portion of the document in FIG. 11 after the qualified blocks are merged with superimposed boxes to depict the identified blocks. The merging results in removal of three blocks 1101, 1102 and 1103 and addition of one block 1201 to the block list.

Note that in order to determine qualified blocks to be merged may involve analyses of block data, analyses of adjacent block data in addition to the metadata.

The next operation performed by the block segmenting and indexing logic 106 (FIG. 1) is the computation of font metadata properties block-item-font-family, block-item-font-size, and block-item-font-weight for each block item in the block list. As different text segments of a block item may have different font characteristics (font family, font size and font weight) it may be useful to compute representative font characteristics for all the text in the block item. While block-item-font-family is the representative font family, block-item-font-size is the representative font size and block-item-font-weight is the representative font weight for all the text in the block item.

In order to compute representative font metadata properties for a block item a set of triplets are prepared, one for each visible word in the text of block item consisting of the word's font family metadata property value, font size metadata property value and font weight metadata property value. The font family, font size and font weight of the triplet occurring the most often (statistical mode) are the metadata property values for block-item-font-family, block-item-font-size and block-item-font-weight respectively. The total number of different triplets in a block item may also be useful and may be stored in yet another metadata property block-item-variance for the block item.

Note that for those block items with text consisting of just a few words, instead of using the triplet that occurs most often, the triplet with the highest font size value or highest font weight value or highest importance value may be used in the computation of font metadata properties. The importance value of a triplet is described with reference to FIG. 13. Further note that in other embodiments, in addition to the invisible words, subscript words, superscript words, words belonging to certain font families e.g., Webdings, may also be not considered in the computation of block item font metadata properties. In yet another embodiment, triplets may be prepared for characters instead of words or statistical mean may be used instead of statistical mode in the calculation of block font metadata properties.

The block segmenting and indexing logic 106 (FIG. 1) may further compute an additional metadata property block-item-importance, as defined in FIG. 13, applicable only to block items. The block-item-importance metadata property for a block item may be thought of as the importance of the block item in relation to the rest of the document. The block-item-importance metadata property for a block item is a function of the block's block-item-font-family, block-item-font-size and block-item-font-weight properties. In general, the higher the block-item-font-size or block-item-font-weight, all else being equal, the higher the block-item-importance.

In the exemplary embodiment of the present disclosure, the block segmenting and indexing logic 106 (FIG. 1) is made available a lookup table pre-populated with importance values for each font family, font size and font weight triplet combination. FIG. 13 depicts a portion of the lookup table 1300. Triplet 1301 consists of "Arial" font family, "8" font size and "700" font weight and its importance value is 1.1 1302. Thus, block-item-importance is 1.1 for a block item with block-item-font-family value equals Arial, block-item-font-size value equals 8 and block-item-font-weight equals 700.

Note that in another embodiment, the importance value in the lookup table may be a range with a lower limit and upper limit instead of a single number which results in a range value for block-item-importance.

Note that in another embodiment, the block segmenting and indexing logic 106 may perform additional block operations which may further split the blocks into multiple blocks or merge blocks into bigger blocks. These operations may be required if the division of the document into blocks by the block segmenting and indexing logic 106 (FIG. 1) may not produce the same result as a user looking at the rendered document and manually dividing the document into logical units. One instance where the splitting of the block into multiple blocks may be required is if the immediate child blocks follow the pattern where in multiple blocks with high block-item-importance value are followed by a series of blocks with low block-item-importance value.

Once all the block operations are done, the next step performed by the block segmenting and indexing logic 106 (FIG. 1) is the identification of title block item for each block in the block list which is not a block item. The title block item for a block is usually located in the top part of the block and may have higher font size or higher font-weight or a different font family or center justified or background color from the rest of the child blocks in the block.

In an exemplary embodiment of the present disclosure, in order for an immediate child block item of a block to be designated as a title block for the immediate parent block, the immediate child block needs to be located within the first three blocks of the parent block and/or center justified and/or has a different foreground or background color than the rest of the immediate blocks and/or has a higher block-item-font-size and/or block-item-font-weight and/or block-item-importance than any of the other child block items (not necessarily immediate blocks).

Note that other embodiments may use other metadata conditions in the identification of title block item for a block. Further note that a user visually looking at a document and the block segmenting and indexing logic 106 (FIG. 1) must identify the same title block items for blocks. If the block segmenting and indexing logic 106 (FIG. 1) identifies wrong title block items for blocks or fails to identify the correct title block items for blocks the metadata conditions in the identification of title block items may have to be revised.

Figure 14:
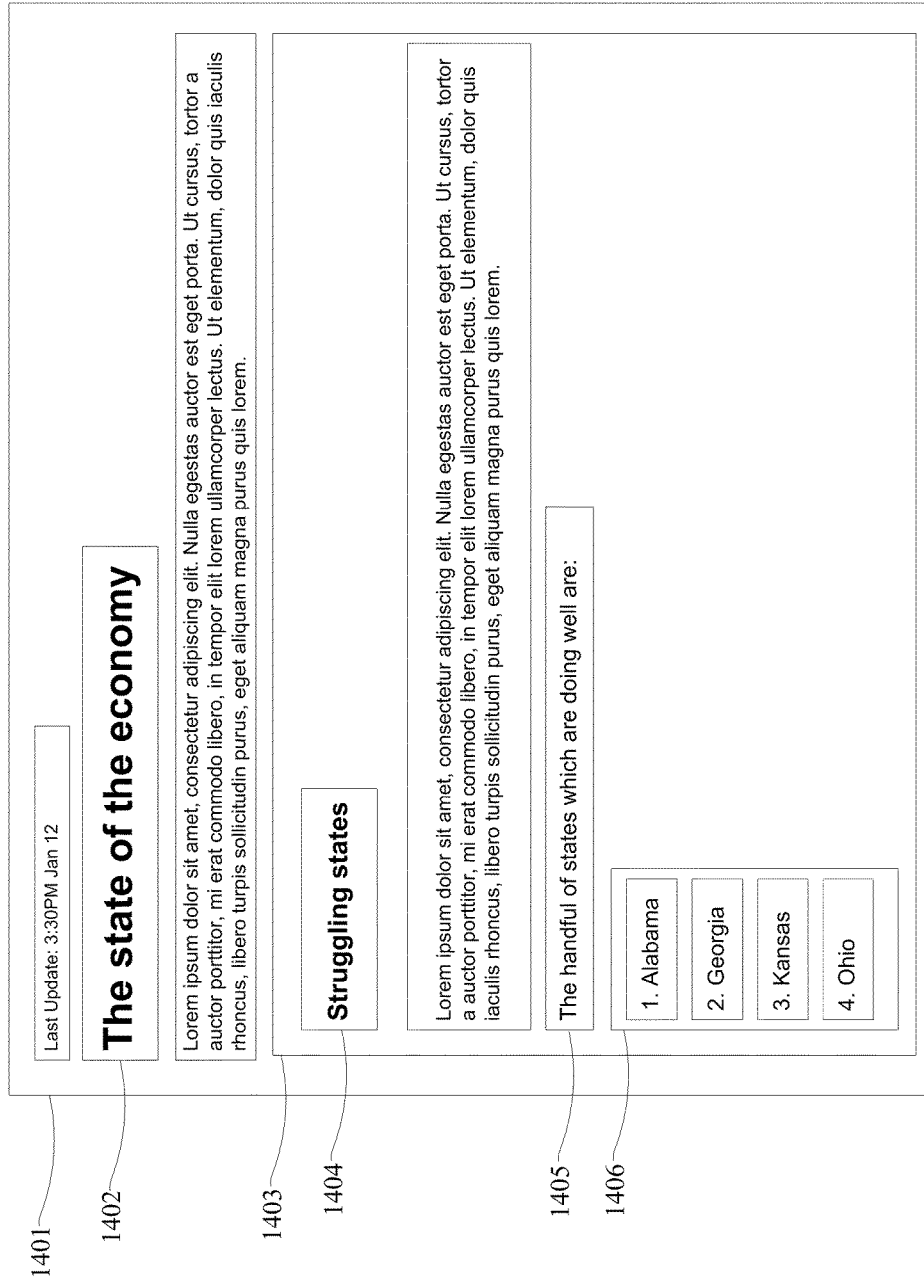
FIG. 14 depicts an exemplary block demarcation performed by the block segmenting and indexing logic of FIG. 2.

FIG. 14 is a diagram illustrating a portion of a document (not to scale) as seen by the user and superimposed on the diagram are boxes to designate blocks identified by the block segmenting and indexing logic 106 (FIG. 1) in that portion. Assume that the block-item-font-size and block-item-importance metadata property values are already computed for all the child block items in the block 1401. Further assume that block item 1402 has the highest block-item-font-size and block-item-importance metadata property values among all the child block items of block 1401. Block item 1402 further is positioned within the first three blocks of block 1401. Hence, block item 1402 is the title block for the block 1401. Similarly, among all the child block items of block 1403, block item 1404 has the highest block-item-font-size and block-item-importance values and is positioned first among all the child blocks of block 1403. Thus, block item 1404 is the title block of block 1403. There is no single immediate child block item of block 1406 which meets the required conditions for being a title block. Hence block 1406 has no title block.

Assume that block 1406 is identified as a list visual element, which is described further herein, and further assume that block 1405 is identified as the title of the list visual element. Since the visual element is part of the block 1403 and block item 1404 is its title block, block item 1404 may also be considered as the title of the list visual element. Further, block 1403 is part of block 1401 and block 1402 is its title block, hence block 1402 may also be considered as the title of the list visual element. In the exemplary embodiment of the present disclosure, a visual element may have only one title. Since title 1405 is the closest of the three identified titles for the visual element, it is considered as the title for the list visual element. In another embodiment, a visual element may have multiple titles and all the three identified titles may be considered as titles for the visual element.

Once title blocks are identified, the next step performed by the block segmenting and indexing logic 106 (FIG. 1) is the identification and indexing of visual elements. There are two types of visual elements, i.e., inline visual elements and block visual elements. An inline visual element spans a portion of a block item whereas a block visual element spans one or more blocks. Typically, inline visual elements are found within a sentence of a block item.

The determination and location of different visual elements are now described further with reference to FIGS. 15 through 37. Notably, the demarcation of the document into blocks further aids in the process of locating visual elements within a document. Superimposed on the source content in the FIGS. 15 through 37 are rectangular dotted boxes to depict blocks identified by the block segmenting and indexing logic 106 (FIG. 1). As will be described further with regards to FIGS. 15 through 37, the block segmenting and indexing logic 106 (FIG. 1) identifies and indexes visual elements in the source content with the aid of data and metadata rules for inline visual elements and profiles for block visual elements.

To identify inline visual elements, the block segmenting and indexing logic 106 (FIG. 1) iterates over all the block items in the block list. For each block item, the block segmenting and indexing logic 106 identifies sentences and finds visual elements within each sentence with the aid of data and metadata rules. The block segmenting and indexing logic 106 (FIG. 1) further creates an index for each found visual element along with the visual element title and visual element characteristics in Index data 109 (FIG. 1).

Note that a group of data and metadata rules not only identify the visual element but may also identify the type of the visual element, title of the visual element and other visual element specific characteristics. Further note that there may be several inline visual element identifying groups and if the sentence or part of a sentence satisfies at least one of the groups, the sentence or part of the sentence is an inline visual element.

With respect to FIG. 15, a user looking at the rendering (not shown) of the document source content 1501 on a display interface identifies a list visual element in the second sentence of the block 1502. A group of generalized data and metadata rules include, a sentence with the word "are" is followed by a ":" and then a series of words separated by a ",", and then the word "and" and a further set of word(s) not separated by ",", identifies like a human user the second sentence in the block 1502 as a list visual element. Further the part of the sentence before the phrase "are:" is identified as the title of the visual element and each of the word(s) separated by either "," or "and" following the phrase "are:" is identified as a list item. Note that a human user identifies the same parts of the sentence as title and list items.

Note that the generalized group of data and metadata rules described above may not identify all the inline list visual elements. If a human user looking at a document identifies an inline list visual element and further the group of data and metadata rules described above doesn't identify the inline list visual element, a new group of data and metadata rules may be needed for the block segmenting and indexing logic 106 (FIG. 1) to identify the inline list visual element of a different format. Thus, for each inline visual element type there may exist several groups of data and metadata rules and the sentence or part of the sentence has to satisfy at least one of the groups to be identified as a visual element of the type the group is defined to identify.

FIG. 16 depicts source content 1601 and FIG. 17 depicts presentation semantics 1701 applicable to the source content 1601. The inline visual element identified in the source content 1601 is a fixed width text visual element. The single word "text-decoration" appears in a font "courier" indicative of fixed width text. Hence, the single word constitutes a visual element. Note that a user looking at the segment 1601 when rendered also identifies the single word "text-decoration" as fixed width text.

To identify block visual elements in a document, the block segmenting and indexing logic 106 (FIG. 1) starts with the block (not block item) with highest level in the block list and determines if the entire block with all its child blocks matches a profile, i.e., a set of rules that identify a visual element. If the entire block matches a profile, the resulting visual element consisting of the entire block along with its title and visual element characteristics is indexed and stored in index data 109 (FIG. 1) and the block is removed from the block list. If the entire block doesn't match a profile and if only a subset of child blocks match a profile, the resulting visual element consisting of the subset of child blocks along with its title and visual element characteristics is indexed and stored in index data 109 (FIG. 1) and the matching subset of child blocks are removed from the block list. If not even a subset of child blocks matches a profile, the entire block along with all its child blocks are deleted and removed from the block list. As a result of deletion of blocks, all the blocks in the block list are again checked. If any block(s) are eligible for any block operation the block operations are performed, which are described further herein and include, for example removing empty block(s), eliminating intermediate block(s), block merging or block splitting. A new block (not block item) is selected from the block list with the highest level and the process is repeated until there are no blocks left to be matched with a profile.

A profile identifies a block visual element of a particular type and consists of a set of rules. Each rule in a profile is made up of two parts. The first part identifies one or more blocks. The second part evaluates one or more data and/or metadata properties for the identified block(s). For example, a profile rule may be, all the child blocks of a block with metadata property table-column-index value equals one must have the same text content and must not have border metadata property value equal to zero. If one or more blocks satisfy all the rules of at least one profile, the group of blocks may be identified as a visual element of the type the profile is designed to identify.

A profile may also identify the title of the visual element along with other visual element characteristics. If no title is identified by the profile, one of the parent blocks title block in which the visual element is identified may be considered as the title of the visual element.

With respect to FIGS. 18 and 19, the visual element identified by a human user when the document source content 1800 is rendered (not shown) is a list visual element. A profile for determining the list visual element looks for a block that consists of a table with two columns where the first column block items of the table block all have the same non-alphabet, non-numeric character which is less than three characters in length. Block 1802 and its child block items 1803 through 1808 meet the conditions of such a profile, and hence the entire block 1802 is a list visual element. Further the block item 1801 preceding the list visual element consists of the phrase "list of", hence the block segmenting and indexing logic 106 identifies the preceding block item as the title of the identified list visual element.

Note that the block segmenting and indexing logic 106 (FIG. 1) while preparing metadata computes table metadata properties for the <TABLE> element spanning the entire block 1802. These table metadata properties may include "table-rows" property with a value of three and the "table-column" metadata property with a value of two. Further for each of the <TD> elements spanning the block items 1803 through 1808, the block segmenting and indexing logic 106 computes table cell metadata properties. For the <TD> element spanning the entire block 1805, the "table-cell-row-index" metadata property would identify the row index value as two and the "table-cell-column-index" metadata property would identify the column index value as one. The profile identifying the block 1802 as a list may take advantage of these table and table cell metadata properties.

The profile further identifies the list visual element characteristics. Each of the block items 1804, 1806 and 1808 with "table-cell-column-index" value equal to two is identified as a list item. The profile further identifies such list as having star bullets inferred from the text of the block item 1803.

The presentation semantics 1900 identifies the block 1802 consisting of <TABLE> element be rendered without a border further confirming the identified visual element as a list visual element.

Figure 20:
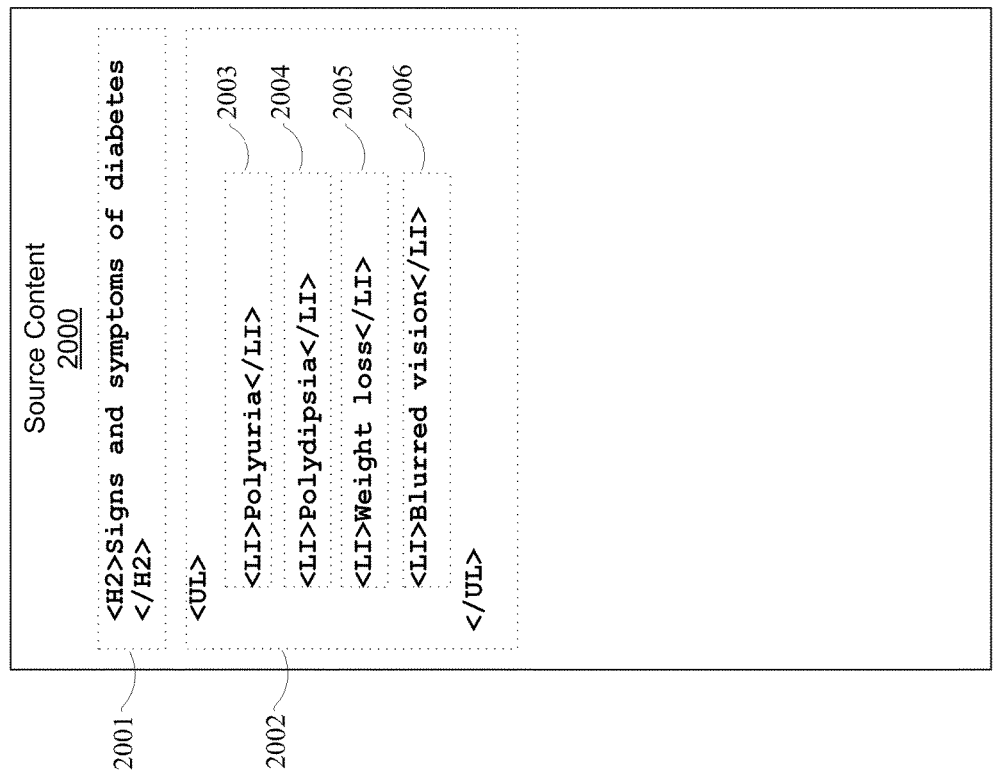
FIG. 20 depicts exemplary source content data containing a visual element of type "List".

With respect to FIG. 20, the visual element identified by a human user when the document source content 2000 is rendered is also a list visual element. A profile for determining a list visual element may look for a block consisting of an unordered list and at least two child block items without the characters "-" or ":" embedded in the text content of the child block. Such a profile would identify the block 2002 as a list visual element. Further the block item 2001 preceding the block 2002 has higher block-item-importance metadata property value than any of the block items 2003-2006 block-item-importance metadata property value and is also made up of just one sentence with plural words; hence block item 2001 is identified as the title of the list visual element.

Note that the block segmenting and indexing logic 106 (FIG. 1) while preparing metadata computes list metadata properties for the <UL> element spanning the entire block 2002. These list metadata properties may include list-items metadata property with a value of four as there are four <LI> elements within the <UL> element. Further for each of the <LI> elements spanning the entire block items 2003 through 2006, the block segmenting and indexing logic 106 computes list item metadata properties. For the <LI> element spanning the entire block 2005, the list-item-index metadata property value which identifies the index is three. The profile identifying the block 2002 as a list may take advantage of these table and table cell metadata properties.

The profile further identifies the list visual element characteristics. Each of the block items 2003 through 2006 is identified as list item from the presence of list-item-index metadata property for each of the <LI> element in the block items. Further from the metadata inferred from implicit presentation semantics for the <UL> element spanning the entire block 2002, the profile identifies the list as having solid round bullets.

Note that the profile rules described for the two profiles above for determining whether a block(s) is a list visual element is not exhaustive, and additional profile rules may be considered by the block segmenting and indexing logic 106 (FIG. 1) in determining whether a block(s) is a list visual element.

Further note that while two profiles are presented to identify list visual element, more list visual element identifying profiles may be needed if a user looking at a rendered document recognizes a list in a segment of the document and none of the two profiles recognize the segment as list visual element.

With respect to FIGS. 21 and 22, the visual element identified by a human user when the document source content 2100 is rendered according to the presentation semantics 2200 is a paragraph visual element. A profile for determining a paragraph visual element may look for a block consisting of at least three sentences and/or at least two hundred words. Such profile would identify the block 2101 as a paragraph visual element. Since no title is identified by the profile, one or all the title blocks of the parent blocks (not shown) of block 2101 may be considered as the title of the identified paragraph visual element.

Note that the profiles which identify paragraph visual elements, in addition to the title may also identify the size, the number of sentences in the paragraph visual element and other paragraph characteristics.

Note that the profile rules described for determining whether a block(s) is a paragraph visual element is not exhaustive, and additional profile rules may be considered by the block segmenting and indexing logic 106 (FIG. 1) in determining whether a block(s) is a paragraph visual element.

Further note that while a single profile is presented to identify paragraph visual element, more paragraph visual element identifying profiles may be needed if a user looking at a rendered document recognizes a paragraph in a segment of the document and the profile fails to recognize the segment as paragraph visual element.

With respect to FIGS. 23 and 24, the visual element identified by a human user when the document source content 2300 is rendered according to the presentation semantics 2400 is a table visual element. A profile for identifying the table may look for a block consisting of a table where the first column of blocks of the table does not have the same text. Further, at least one of the first column blocks of the table has text content with a length that is greater than five characters and at least one of the first column blocks of the table text content does not end with a punctuation character. Such profile rules would identify the block 2302 as a table visual element. Further the block 2301 preceding the block 2302 ends with the text "following table:" which makes the last sentence of the block 2301 containing the text "following table:" the title of the identified table visual element. Since the block items 2303 and 2304 have higher block-item-importance metadata property values than any other child block items of block 2302 and further the blocks are part of the first row and the markup tag of the blocks is <TH>, these blocks are identified as table headers.

Note that the profile may also identify the blocks 2305 through 2310 as table cells because a <TD> element spans the entirety of each of these blocks. Further the profile may also identify the table visual element as having three rows and two columns.

With respect to FIGS. 25 and 26, the visual element identified by a human user when the document source content 2500 is rendered according to the presentation semantics 2600 is a table visual element. A profile for identifying a table visual element may look for a block with presentation semantics "display" as "table" and a visible border and the child blocks with presentation semantics "display" as "table-cell" with visible border and the table cell blocks spread over more than one row and one column. Such a profile would identify the block 2502 as a table visual element. Similar to block 2301 (FIG. 23) the last sentence of the block 2501 will be identified as the title of the identified table visual element. Since the blocks 2503 and 2504 are part of the first row and have higher block-item-importance than any other blocks in the block 2502, these blocks are identified as the header blocks. The blocks 2505 through 2510 will be identified as table cells as they have an explicit metadata property display value table-cell.

Note that the profile rules described for the two profiles above for determining whether a block(s) is a table visual element is not exhaustive, and additional profile rules may be considered by the block segmenting and indexing logic 106 (FIG. 1) in determining whether a block (s) is table visual element.

Further note that while two profiles are presented to identify table visual elements, more table visual element identifying profiles may be needed if a user looking at a rendered document recognizes a table in a segment of the document and none of the two profiles recognize the segment as table visual element.

With respect to FIGS. 27 and 28, the visual element identified by a human user when the document source content 2700 is rendered according to the presentation semantics 2800 is a key/value visual element. A profile for determining a key/value visual element looks for a table block with two columns where each of the first column block text content ends with a colon except the block in the first row. In addition, the block in the first row spans two columns. Such profile identifies the block 2701 as a key/value visual element with first row block 2702 as the title of the identified key/value visual element. Further the first column blocks 2703, 2705, and 2707 will be identified as the keys and the second column blocks 2704, 2706 and 2708 will be identified as the values of the keys by the profile.

Note that the profile rules described for the profile above for determining whether a block(s) is a key/value visual element is not exhaustive, and additional metadata rules may be considered by the block segmenting and indexing logic 106 (FIG. 1) in determining whether a block(s) is a key/value visual element.

Further note that while a single profile is presented to identify key/value visual elements, more key/value visual element identifying profiles may be needed if a user looking at a rendered document recognizes a key/value property in a segment and the profile fails to recognize the segment as key/value visual element.

With respect to FIG. 29, the visual element identified by a human user when the document source content 2900 is rendered is a question/answer visual element. A profile for determining a question/answer visual element is designed to look for a block with text content starting with the string "Q:" and ending with the string "?" and followed by a block with a tag <P>. Such a profile identifies the blocks 2901 and 2902 as question/answer visual element. Further the block 2901 with text content starting with "Q:" and ending with the string "?" is identified as the question and the block 2902 following the block 2901 as the answer.

Note that the profile rules described for the profile above for determining whether a block(s) is question/answer visual element is not exhaustive, and additional profile rules may be considered by the block segmenting and indexing logic 106 (FIG. 1) in determining whether a block(s) is question/answer visual element.

Further note that while a single profile is presented to identify question/answer visual elements, more question/answer visual element identifying profiles may be needed if a user looking at a rendered document recognizes a question/answer in a segment and the profile fails to recognize the segment as question/answer visual element.

With respect to FIGS. 30 and 31, the visual element identified by a human user when the document source content 3000 is rendered according to the presentation semantics 3100 is a menu visual element. A profile for determining a menu visual element is designed to look for an unordered list block with child list item blocks displayed inline and are hyperlinks and further the unordered list block is located in the top twenty percent region of the document. Such profile would identify the block 3001 as a menu visual element. Each of the list item block elements 3002 through 3005 are further identified as menu items for the identified menu visual item.

Note that the profile rules described for the profile above for determining whether a block(s) is a menu visual element is not exhaustive, and additional profile rules may be considered by the block segmenting and indexing logic 106 (FIG. 1) in determining whether a block(s) is a menu visual element.

Further note that while a single profile is presented to identify menu visual elements, more menu visual element identifying profiles may be needed if a user looking at a rendered document recognizes a menu in a segment of the document and the profile fails to recognize the segment as menu visual element.

With respect to FIGS. 32 and 33, the visual element identified by a human user when the document source content 3200 is rendered according to the presentation semantics 3300 is a fixed width text visual element. A profile for determining whether the document contains a fixed width text visual element looks for a table block with all the blocks, except for the blocks in the first row, having block-item-font-family metadata property value equal to a font family with constant width characters. Such a profile would identify the block 3201 as a fixed width text visual element. Further the first row block 3202 has highest block-item-importance value and is in a different presentation semantics than the rest of the rows. Hence the block 3202 is identified as the title of the identified fixed width text visual element.

Note that the profile rules described for the profile above for determining whether a block(s) is a fixed width text visual element is not exhaustive, and addition profile rules may be considered by the block segmenting and indexing logic 106 (FIG. 1) in determining whether a block(s) is fixed width text visual element.

Further note that while a single profile is presented to identify fixed width text visual elements, more fixed width text visual element identifying profiles may be needed if a user looking at a rendered document recognizes a fixed width text in a segment of the document and the profile fails to recognize the segment as fixed width text visual element.

With respect to FIG. 34, the visual element identified by a human user when the document source content 3400 is rendered is a timeline visual element. A profile for identifying a timeline visual element looks for an unordered list block with all the blocks starting with a year followed by a "-" or ":". Such a profile would identify the block 3402 as a timeline visual element. Further the block immediately located above the block 3402 has one sentence with the word "timeline" in it. Hence, the block 3401 is identified as the title of the timeline visual element. Further the unordered list items 3403 through 3407 will be identified as timeline events.

Note that the profile rules described for the profile above for determining whether a block(s) is a timeline visual element is not exhaustive, and other rules may be considered by the block segmenting and indexing logic 106 (FIG. 1) in determining whether a block(s) is a timeline visual element.

Further note that while a single profile is presented to identify timeline visual elements, more timeline visual element identifying profiles may be needed if a user looking at a rendered document recognizes a timeline in a segment of a document and the profile fails to recognize the segment as timeline visual element.

With respect to FIG. 35, the visual element identified by a human user when the document source content 3500 is rendered is a graph/chart visual element. A profile for identifying a graph/chart visual element is looks for a block with a single image and the alternate text containing the word "chart" and the block located immediately above has a single sentence with the word "chart." Such a profile would identify the block 3502 as a graphs/chart visual element. The single sentence block 3501 is identified as the title of the identified graph/chart visual element.

Note that the profile rules described for the profile above for determining whether a block(s) is a graph/chart visual type is not exhaustive, and additional profile rules may be considered by the block segmenting and indexing logic 106 (FIG. 1) in determining whether a block(s) is a graph/chart visual element.

Further note that while a single profile is presented to identify graph/chart visual elements, more graph/chart visual element identifying profiles may be needed if a user looking at a rendered document recognizes a graph/chart in a segment of the document and the profile fails to recognize the segment as graph/chart visual element.

With respect to FIG. 36, the visual element identified by a human user when the document segment 3600 is rendered is an interactive visual element. A profile for identifying an interactive visual element looks for a block with a single object and the block item located immediately above has a single sentence with the word "interactive." Such a profile would identify the block 3602 as an interactive visual element. The single sentence block 3601 is identified as the title of the identified interactive visual element.

Note that the profile rules described for the profile above for determining whether a block(s) is interactive visual element is not exhaustive, and other rules may be considered by the block segmenting and indexing logic 106 (FIG. 1) in determining whether a block(s) is interactive visual element.

Further note that while a single profile is presented to identify interactive visual elements, more interactive visual element identifying profiles may be needed if a user looking at a rendered document recognizes an interactive object in a segment of the document and the profile fails to recognize the segment as interactive visual element.

FIG. 37 illustrates the source content 3700 in which the document author provided hints for the block segmenting and indexing logic 106 (FIG. 1) to identify the block timeline visual element. The hint vse-timeline 3708 identifies the <DIV> element encompassing the whole of block 3701, contains a timeline visual element. The hint vse-title 3709 identifies the title of timeline visual element as the <H2> element encompassing the block 3702. The hint vse-event 3710 identifies the <LI> element spanning the block 3703 as the timeline event. Similarly, the hint vse-event in the blocks 3704 through 3707 identifies each of the <LI> elements spanning the blocks 3704 through 3707 as timeline events.

Note that hints may be pre-defined and their appropriate use specified by the search engine server 102 (FIG. 1) for the document authors. Further note that while in the exemplary embodiment, class attributes are used as hints, in other embodiments hints may be specified using other methods developed or future developed such as, Resource Description Framework (RDF), Resource Description Framework in attributes (RDFa) and/or microformats.

Note that predefined hints may also be specified by the search engine server 102 (FIG. 1) for paragraph, table, list, menu, graph/chart, fixed width text, interactive, key/value, and question/answer visual element types and available to document authors in identifying visual elements in documents. Further note that in addition to identifying titles, the predefined hints may also be specified by the search engine server 102 (FIG. 1) and available to document authors to identify visual element characteristics.

Note that in one embodiment, if hints are present, they may be used only to verify if the block segmenting and indexing logic 106 (FIG. 1) identified the visual element and/or visual element characteristics correctly. In another embodiment, hints may be used as a substitute for profiles in identifying visual elements and/or visual element characteristics. In yet another embodiment, hints may be used along with profiles to identify visual elements and/or visual element characteristics.

Figure 38:
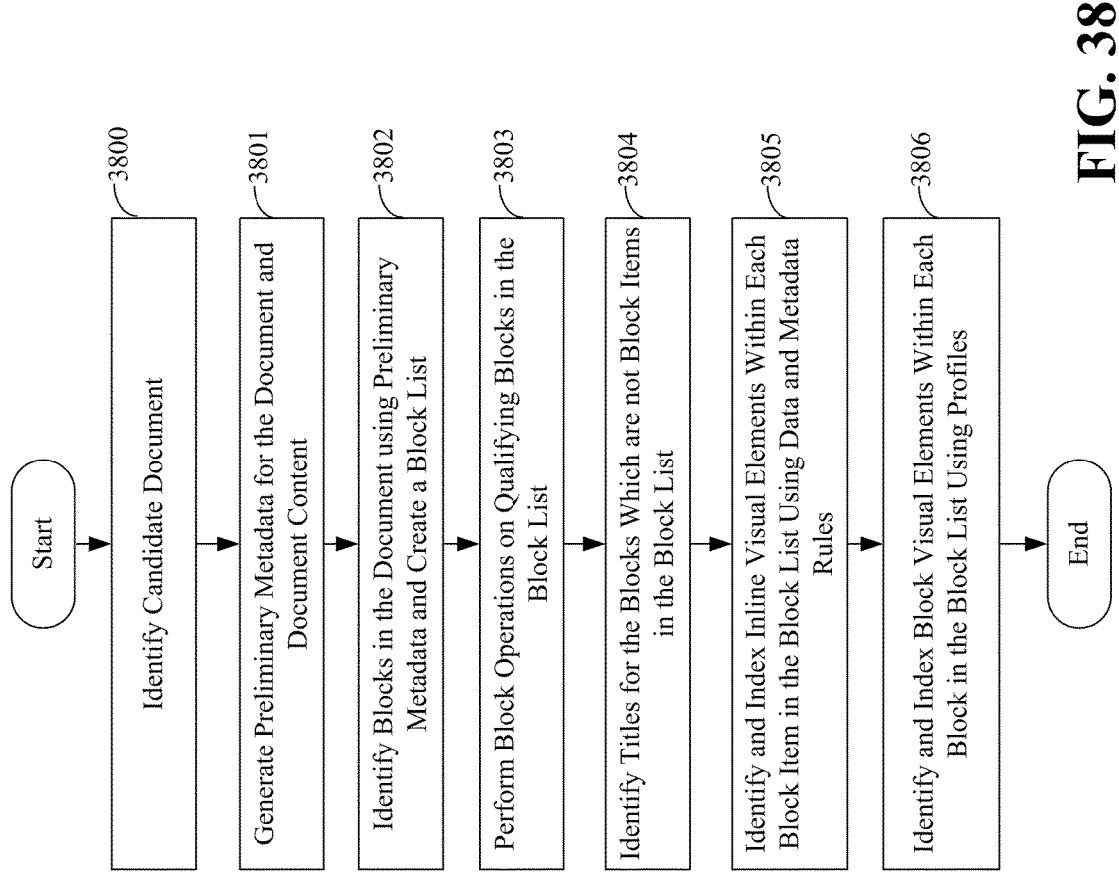
FIG. 38 is a flowchart depicting exemplary architecture and functionality of the block segmenting and indexing logic depicted in FIG. 2.

FIG. 38 is a flowchart depicting exemplary high-level architecture and functionality of the block segmenting and indexing logic 106 depicted in FIG. 1 and described herein throughout. In step 3800, the block segmenting and indexing logic 106 (FIG. 1) identifies a candidate document to be processed. In step 3801, the block segmenting and indexing logic 106 (FIG. 1) generates preliminary metadata for the document and segments the document content. In step 3802, using the preliminary metadata, the document is divided into logical units called blocks and a list of blocks is prepared using block identifying rules described hereinabove. In step 3803, the block segmenting and indexing logic 106 (FIG. 1) performs block operations on qualifying blocks. The block operations may add, delete or modify blocks in the block list. In step 3804, the block segmenting and indexing logic 106 (FIG. 1) identifies for each block which is also not a block item in the block list a title (if any). In step 3805, each of the block items in the block list is examined by for inline visual elements using data and metadata rules described hereinabove. If any inline visual element is found it is indexed. In step 3806, each of the blocks in the block list is examined for block visual elements using profiles described hereinabove. If any block visual element is found it is indexed.

Note that each of the steps 3802 through 3806 generates further metadata which augments the metadata generated in step 3801.

Note that while segmenting the document into blocks and performing block operations aids in the identification of visual elements, in other embodiment, visual elements may be identified by applying data and metadata rules to source content segments without identifying blocks.

Once the documents found by the crawler logic 105 have been block segmented and the visual elements in the documents identified and indexed, the documents may be searched for visual elements.

Figure 39:
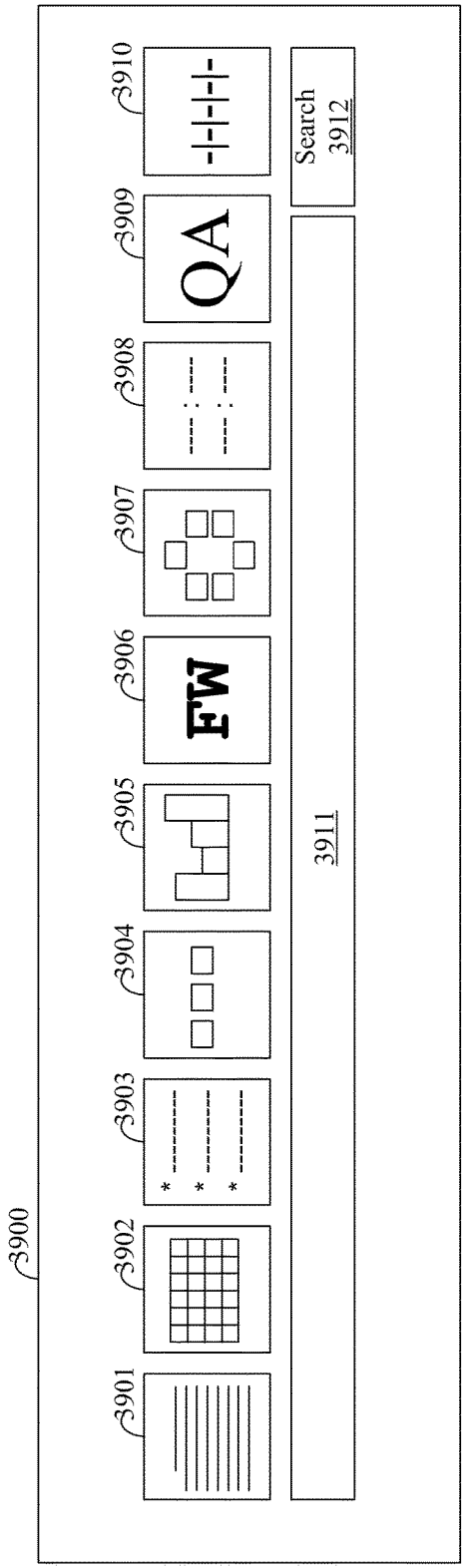
FIG. 39 depicts an exemplary graphical user interface (GUI) that may be presented to the user by the search engine system of FIG. 1.

Thus, FIG. 39 depicts an exemplary graphical user interface (GUI) that may be used in an embodiment of the present disclosure. Such GUI may be displayed to the user 113 (FIG. 1) by the client logic 112 (FIG. 1) or it may be displayed to the user 114 (FIG. 1) by the search engine logic 107 (FIG. 1).

The GUI 3900 comprises a plurality of buttons 3901-3910, each button corresponding to a type of search to be performed. In addition, the GUI 3900 comprises a text field 3911 for entering keyword(s) for which the user 113 or 114 desires to search and a "Search" bottom 3912 for selection to begin a search.

As indicated each of the buttons 3901-3910 corresponds to a different visual element type for which to search. The user selects one or more visual element types by selecting the corresponding buttons 3901-3910, the user enters keyword(s) in the text fields 3911, and then the user selects the "Search" button 3912.

If the user desires to search on keyword(s) entered in the text field 3911 and get "Paragraph" results, the user selects button 3901. If the user desires to search on keyword(s) entered in the text field 3911 and get "Table" results, the user selects button 3902. If the user desires to search on keyword(s) entered in the text field 3911 and get "List" results, the user selects button 3903. If the user desires to search on keyword(s) entered in the text field 3911 and get "Menu"

results, the user selects button 3904. If the user desires to search on keyword(s) entered in the text field 3911 and get "Graphs" or "Charts" results, the user selects button 3905. If the user desires to search on keyword(s) entered in the text field 3911 and get "Fixed Width Text" results, the user selects button 3906. If the user desires to search on keyword(s) entered in the text field 3911 and get "Interactive Data" results, the user selects button 3907. If the user desires to search on keyword(s) entered in the text field 3911 and get "Key/Value" results, the user selects button 3908. If the user desired to search on keyword(s) entered in the text field 3911 and get "Question/Answer" results, the user selects button 3909, and if the user desires to search on keyword(s) entered in the text field 3911 and get "Timeline" results, the user selects button 3910.

The search engine logic 107 (FIG. 1) further supports the use of operators and modifiers. An operator is a predefined codeword in a syntax specified by the search engine logic 107 (FIG. 1) and entered into the text field 3911 and are not interpreted as keyword(s) by the search engine logic 107 (FIG. 1). In the exemplary embodiment of the present disclosure, the codeword of an operator is case insensitive and is entered in a syntax where in the operator codeword is always followed by a ":" and may be followed by search keyword(s).

To search for "diabetes" and get "Paragraph" results, assuming that the codeword to get "Paragraph" results is "p" as defined by the search engine logic 107 (FIG. 1), the user may enter "p:diabetes" or "P:diabetes" into the text field 3911 and select the "Search" push button 3912. Similarly, other visual elements may have other codewords. Further, to search for "diabetes" and get "Paragraph" or "Table" results, assuming that the codeword to get "Paragraph" results is "p" and "Table" results is "tb" as defined by the search engine logic 107 (FIG. 1), the user may enter "p||tb:diabetes" or "tb||p:diabetes" into the text field 3911 and select the "Search" push button 3912. Note that the "||" in the syntax represents "or" and is a modifier.

The "or" modifier may also be used as part of keywords. For example, to search for "cars" or "vans" and get "Paragraph" results the user may enter "p:cars||vans" into the text field 3911 and select the "Search" push button 3912. Alternately, the user may enter "cars||vans" into the text field 3911, select the button 3901 for "Paragraph" results and select the "Search" push button 3912.

The "not" modifier is used to exclude certain results. For example, to get "Table" results about "jaguar" cats and not get results about "jaguar" car, the user may enter "tb: jaguar ~car" into the text field 3911 and select the "Search" push button 3912. Alternately, the user may enter "jaguar ~car" into the text field 3911, select the button 3902 for "Table" results and select the "Search" push button 3912.

The predefined operator "comp" lets the user search for all the visual elements at once. This eliminates the need to select all the buttons 3901-3910. To search for "diabetes" and get results for all visual element types, the user may enter "comp:diabetes" or "COMP:diabetes" into the text field 3911 and select the "Search" push button.

The predefined operator "site" lets the user limit search results to a location or domain. To search for "diabetes" and get "Table" results only from BBC® News domain, the user may enter "site:news.bbc.co.uk tb:diabetes" or "tb:diabetes site:news.bbc.co.uk" into the text field 3911 and select the "Search" push button 3912. Alternately, the user may enter "site:news.bbc.co.uk diabetes" or "diabetes site:news.bbc.co.uk" into the text field 3911, select the button 3902 for "Table" results and select the "Search" push button 3912.

If the user desires, the user may specify visual element characteristics as part of a search query. This may be done through either GUI components or operators and may result in narrowing down or assigning higher relevance to those documents with visual elements which meet the visual element characteristics.

While searching for "Paragraph" results, the user may specify that a keyword(s) must be part of the title, or a "Paragraph" result must be at least or equal to or at most a specified length.

While searching for "Table" results, the user may specify that a keyword(s) must be part of the title or must be part of table header or must be part of table caption or must be part of a table cell, or a "Table" result must have at least, equal to or at most a certain number of rows or columns.

While searching for "List" results, the user may specify that a keyword(s) must be part of the title or must be part of list caption, or a "List" must have at least, equal to or at most a certain number of list items.

While searching for "Menu" results, the user may specify that he is interested in "Menu" results that are horizontally or vertically displayed.

While searching for "Graphs or Charts" results, the user may specify that a keyword(s) must be part of the title or must be part of caption, or a "Graphs/Charts" result is a histogram or harries graph or Hoffman graph or bar chart or column chart or line chart or step-line chart or spline-area chart range-column chart stock chart or doughnut chart or bubble chart or candlestick chart or pie chart While searching for "Fixed Width Text" results, the user may specify that a keyword(s) must be part of the title, or a "Fixed Width Text" result must be at least or equal to or at most a specified length.

While searching for "Key/Value" results, the user may specify that a keyword(s) must be part of the title or must be part of the "Key" or must be part of the "Value", or a "Key/Value" result must have at least, equal to or at most a certain number of key/value items.

While searching for "Question/Answer" results, the user may specify that a keyword(s) must be part of the title or must be part of the "Question" or must be part of the "Answer".

While searching for "Timeline" results, the user may specify that a keyword(s) must be part of the title or must be part of the timeline events.

Figure 40:
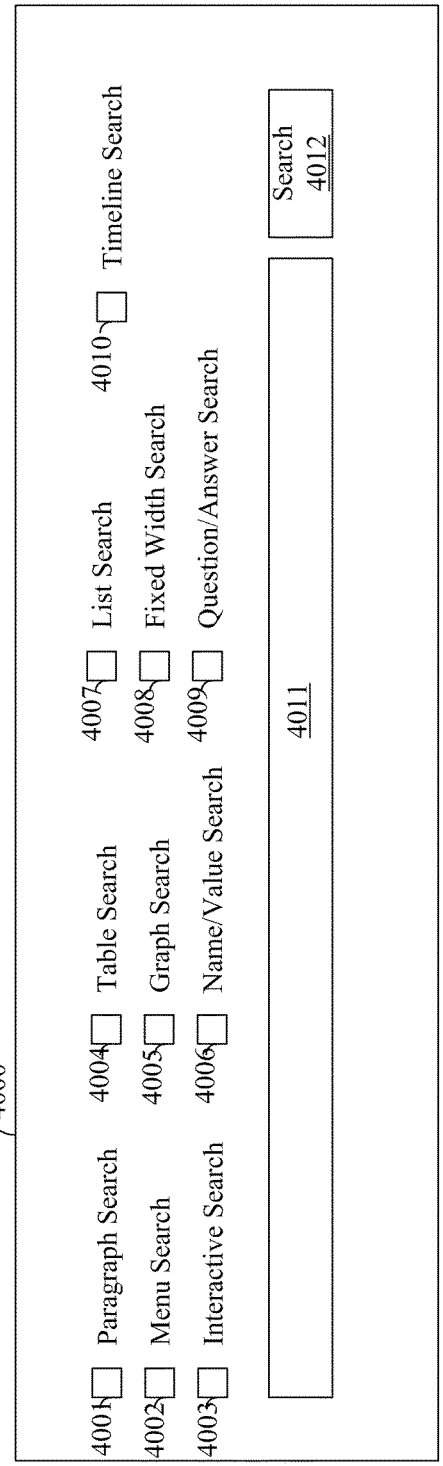
FIG. 40 depicts another exemplary GUI that may be presented to the user by the search engine system of FIG. 1.

FIG. 40 depicts a GUI 4000 that works in a similar way to GUI 3900. However, instead of buttons 3901-3910 (FIG. 39) corresponding to each of the visual element types, the GUI 4000 comprises selection checkboxes 4001-4010. During operation, the user 113 or 114 (FIG. 1) selects one or more checkboxes 4001-4010, enters keyword(s) in a text field 4011, and selects the "Search" push button 4012.

Figure 41:
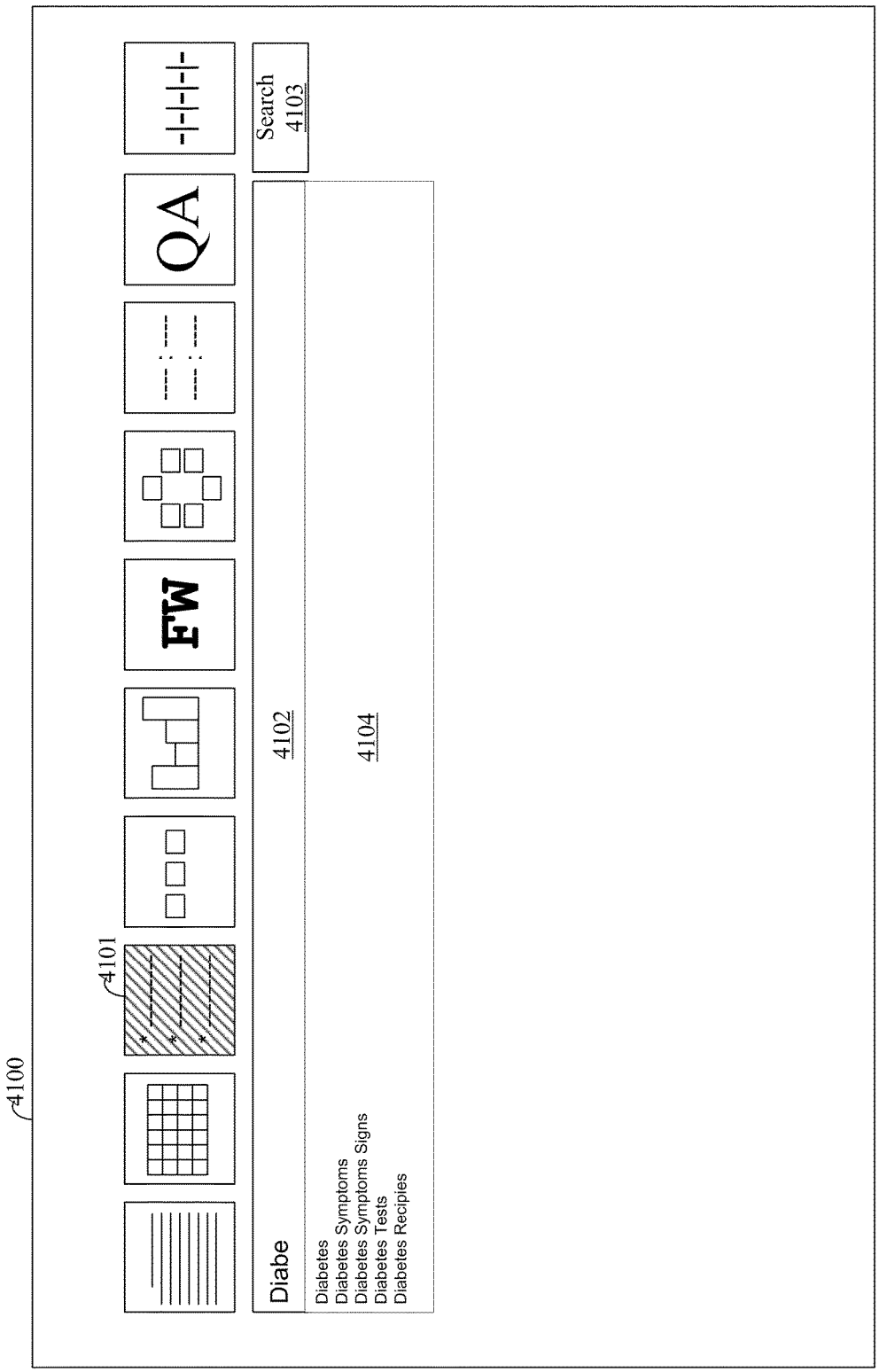
FIG. 41 depicts exemplary GUI providing the user with keyword suggestions as the user is inputting the search query for the search engine system of FIG. 1.

FIG. 41 depicts a GUI 4100 that is displayed to the user 113 (FIG. 1) by the client logic 112 (FIG. 1) or it may be displayed to the user 114 (FIG. 1) by the search engine logic 107 (FIG. 1) providing suggestions 4104 to the user as the user is inputting a visual element type "list" search keyword(s) 4102. The user pushed the button 4101 indicating the search be restricted to visual element type "list". The diagonal background stripes on the button 4101 as shown in the FIG. 41 are added to indicate the push state of the button and are not part of the actual GUI 4100. The suggestions 4104 are based on the "list" selection 4101 and search query keyword(s) 4102 and are updated as the search query 4102 is updated by the user. If the user likes a suggestion from suggestion box 4104, he can pick the suggestion and push the "Search" button 4103 to perform the search by that suggestion.

Note that the suggestions 4104 may be dependent on the selected visual element type(s) in the search query and a different selection of visual element types may result in different keyword suggestions 4104. Further note that in another embodiment, not only are the suggestions 4104 updated as the user is inputting search keyword(s) 4102, the results of the search query may also be instantly updated as the user is inputting search keyword(s) without the need for the user to push to the "Search" button 4103.

FIG. 42 depicts a GUI 4200 that is displayed to the user 113 (FIG. 1) by the client logic 112 (FIG. 1) or it may be displayed to the user 114 (FIG. 1) by the search engine logic 107 (FIG. 1) with the search results as the result of the user pushing the "Search" button 4203 and performing a search using the search keywords "Diabetes Symptoms" 4202. The user pushed the button 4201 indicating the search be restricted to visual element type "list". The diagonal background stripes on the button 4201 as shown in the FIG. 42 are added to indicate the push state of the button and are not part of the actual GUI 4200. The search results 4204, 4205 and 4206 are displayed in horizontal format to the user i.e. one after the other. Each search result 4204, 4205 and 4206 has a heading which is also a link to the original web page 111 (FIG. 1). The heading is followed by a brief summary. The summary is that part of the web page which is relevant to the search query. The summary is shown in the same visual element type as found in the original web page 111 (FIG. 1). The search result 4204 shows "Polyuria" and "Polydipsia" as a list with circular bullets because the web page 111 (FIG. 1) from which the block segmenting and indexing logic 106 (FIG. 1) extracted and indexed the list has the words as list with circular bullets. The search result 4205 shows "Weight Loss" and "Polydipsia" as a list with number bullets because the web page 111 (FIG. 1) from which the block segmenting and indexing logic 106 (FIG. 1) extracted the list has the words as list with number bullets. The search result 4206 shows "Blurred Vision" and "Weight Loss" as a list with lowercase alphabetic bullets because the web page 111 (FIG. 1) from which the block segmenting and indexing logic 106 (FIG. 1) extracted the list has the words as list with lowercase alphabetic bullets. The summary is followed by a URI to the web page 111 (FIG. 1). GUI 4200 has Advertisements section 4208 to the right of the search results 4204, 4205 and 4206. Marketers can bid to show their advertisements in the Advertisements section 4208. If there are more results than fit in a single page the results are split across multiple pages. The user has access to the multiple pages using the pagination control 4207.

Figure 43:
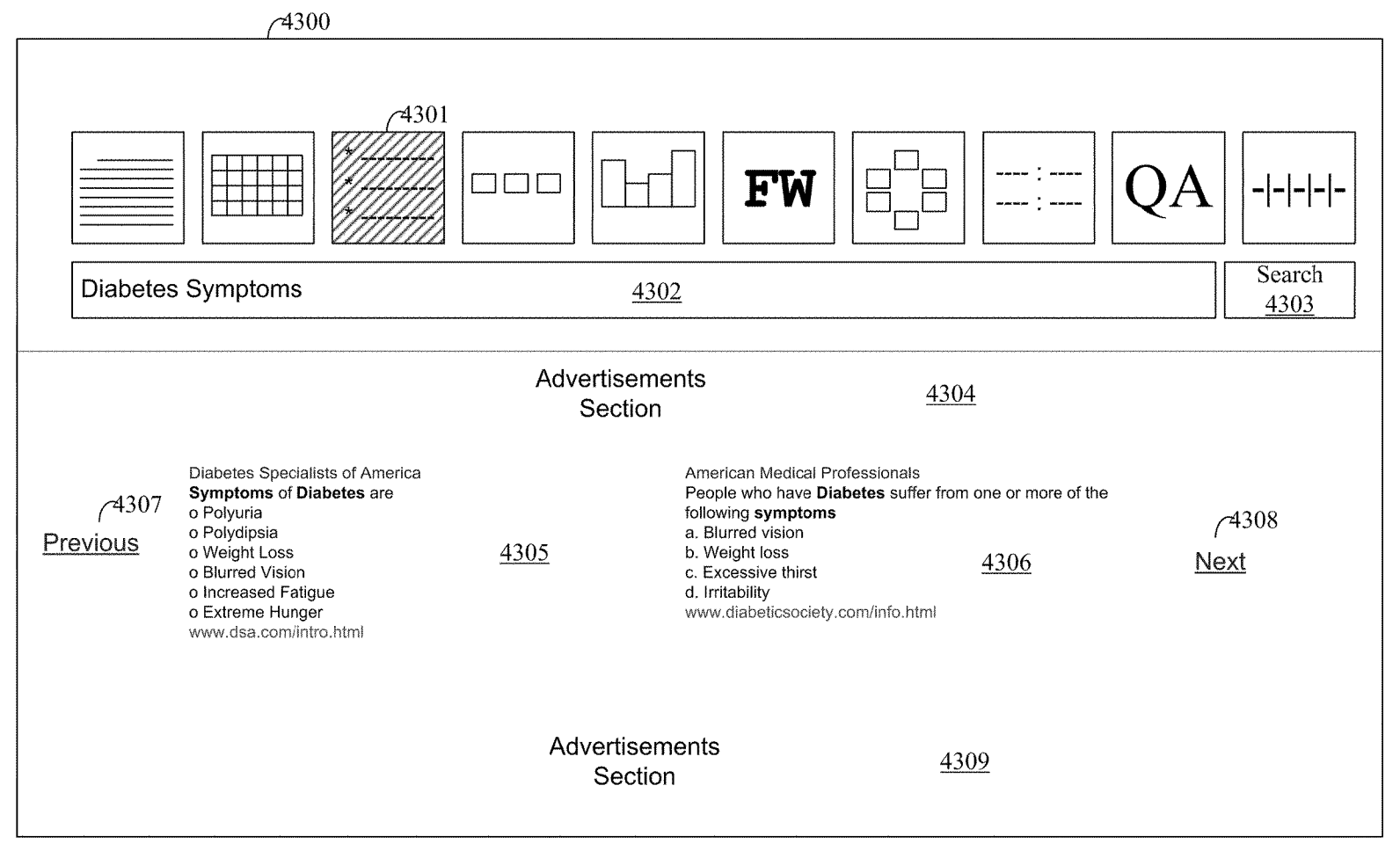

FIG. 43 shows another example of search results 4305 and 4306 arranged side by side i.e. vertically. The user can use the Previous link 4307 or Next link 4308 to view more search results if they are available. Advertisement sections 4304 and 4309 are where marketers can bid to place their ads. Though not shown in the FIG. 4300 advertisement sections are not limited to above and below search results. They can be placed to the right, left or anywhere on the results page.

Figure 44:
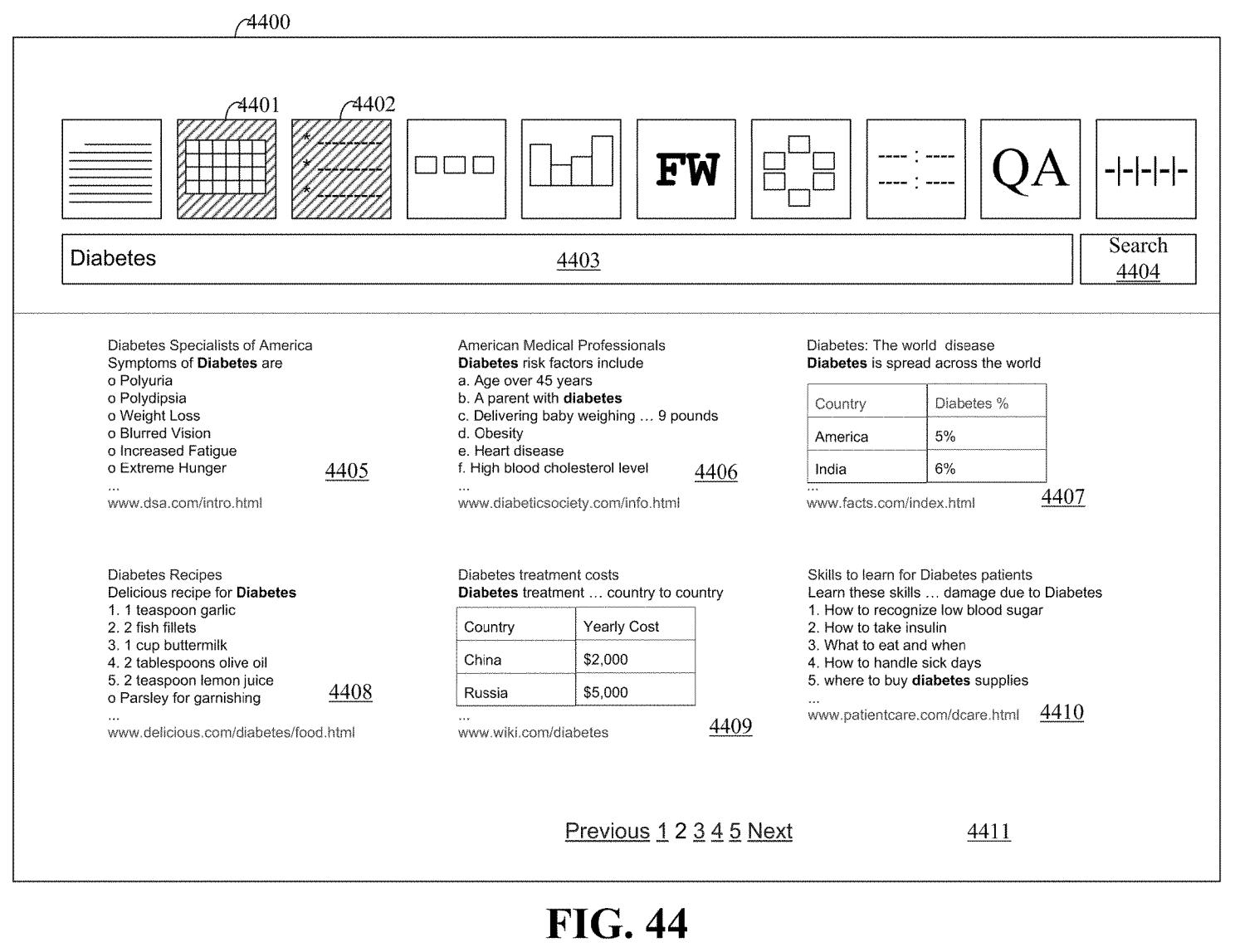

FIG. 44 shows another example of search results 4405, 4406, 4407, 4408, 4409 and 4410 arranged in a grid view. FIG. 4400 depicts a user performing search on keywords "Diabetes" 4403. FIG. 4400 also depicts a user restricting the results to visual element type "table" and "list" by pushing the buttons 4401 and 4402 respectively. The diagonal background stripes on the buttons 4401 and 4402 as shown in the FIG. 44 are added to indicate the push state of the button and are not part of the actual GUI 4400. The search result 4407 shows a section of the summary as table because the web page 111 (FIG. 1) from which the block segmenting and indexing logic 106 (FIG. 1) extracted the summary has the section as table.

Although the present disclosure has been described with respect to a specific preferred embodiment thereof, various changes and modifications may be suggested to one skilled in the art and it is intended that the present disclosure encompass such changes and modifications as fall within the scope of the appended claims.

The invention claimed is:

1. A computer-implemented method for processing and identifying documents in accordance with their relevance to a search query, the method comprising:

generating, by a computer, preliminary metadata for a document of visual element types, the preliminary metadata generated from source content, implicit presentation semantics, and explicit presentation semantics of the document and comprising key/value pairs indicative of the source content, the implicit presentation semantics and the explicit presentation semantics, wherein the preliminary metadata is used to determine different blocks in the document of visual element types;

identifying, by the computer, one or more blocks as a logical unit in the document that is visually displayed to a display device, by comparing the key/value pairs in the generated preliminary metadata to key/value pairs in a block identifying criterion set, wherein the comparison of the key/value pairs in the block identifying criterion set to the key/value pairs in the generated preliminary metadata evaluates to a true indication when the preliminary metadata indicates a block or a false indication when the preliminary metadata does not indicate a block;

preparing, by the computer, a block list of the one or more identified blocks;

processing, by the computer, blocks in the prepared block list of the identified blocks using block operations selected from removing empty block(s), removing overlapping block(s), removing overlapped block(s), removing intermediate block(s), merging block(s), splitting block(s) and combinations thereof;

identifying based on a profile, by the computer, a visual element within a block in the prepared block list by starting with a block having highest level in the block list to determine if the block in the block list satisfies all rules of the profile, the block in the prepared block list is identified as the visual element of a visual element type by the profile, wherein the visual element is an inline visual element or a block visual element that is selected from paragraph, table, list, menu, fixed width text, key/value, graph/chart, question/answer, timeline, and interactive, the profile is a set of rules that identifies and classifies a matching block into the visual element type;

generating, by the computer, an index of the identified visual element and storing the index in a data store in a memory;

receiving, by the computer, a user search query via a Graphical User Interface (GUI) on a computer, wherein the user search query comprises at least one selected visual element type selected from paragraph, table, list, menu, fixed width text, key/value, graph/chart, question/answer, timeline, and interactive;

upon receiving the user search query, determining, by the computer, whether the data store contains terms that match the user search query by the at least one selected visual element type in the user search query; and generating, based on the determining for the data store by the computer, prioritized search results in a response to the user search query with identification of document(s) that comprise of visual element(s) of the user search query's the at least one selected visual element type.

2. The method of claim 1, wherein a visual element title is identified for the visual element.

3. The method of claim 2, wherein at least one predefined hint is provided in the source content by a document author or owner regarding at least one visual element and identifies at least one of the visual element type, the visual element title, and the visual element characteristics.

4. The method of claim 2, wherein the index prepared for visual element(s) further comprises of titles of the visual element(s).

5. The method of claim 2, wherein the user search query comprises a request with at least one visual element specific characteristics.

6. The method of claim 1, wherein the GUI comprises a toggle button or a check box for selection by a user for identifying the visual element type adjacent a keyword entering textbox.

7. The method of claim 1, wherein the GUI displays data related to the user search query as a search query is being received in the step of the receiving.

8. The method of claim 1, wherein the GUI displays response search results related to the user search query as a search query is being received in the step of the receiving.

9. The method of claim 1, wherein the user search query comprises a request with at least one negative modifier.

10. The method of claim 1, wherein the user search query comprises a request with at least one modifier.

11. The method of claim 1, wherein the user search query comprises a request with at least one restricted location operator.

12. The method of claim 1, wherein the user search query comprises a request with at least one visual element type identifier operator.

13. The method of claim 1, wherein the user search query comprises a request with at least one all-inclusive operator.

14. The method of claim 1, wherein the search results are displayed in the visual element type as the visual element is found in the document.

15. The method of claim 1, wherein the search results are displayed in the visual element type and in a same presentation semantics as the visual element is found in the document.

16. The method of claim 1, wherein the search results are displayed in a horizontal list format, in a vertical list format or in a grid format.

17. The method of claim 1, wherein the generating for the response further comprises displaying advertisement data.

18. The method of claim 1, wherein the generating for the response further comprises displaying advertisement data based upon a visual element type selected.

19. The method of claim 1, wherein visual element characteristics are identified for the visual element.

20. The method of claim 2, wherein the index prepared for visual element(s) further comprises of visual element characteristics of the visual element(s).

* * * * *